(12) United States Patent
Leeuwenburgh et al.

(10) Patent No.: US 11,999,822 B2
(45) Date of Patent: Jun. 4, 2024

(54) POLYOXAZOLINE COPOLYMER COMPRISING CALCIUM BINDING GROUPS

(71) Applicant: GATT TECHNOLOGIES B.V., Nijmegen (NL)

(72) Inventors: Sander Cornelis Gerardus Leeuwenburgh, Nijmegen (NL); Jan Cornelis Maria Van Hest, Nuenen (NL); María José Sánchez-Fernández, Nijmegen (NL); Rosa Pilar Felix Lanao, Nijmegen (NL); Joost Opsteen, Nijmegen (NL); Johannes Caspar Mathias Elizabeth Bender, Nijmegen (NL)

(73) Assignee: CILAG INTERNATIONAL GMBH, Zug (CH)

( * ) Notice: Subject to any disclaimer, the term of this patent is extended or adjusted under 35 U.S.C. 154(b) by 171 days.

(21) Appl. No.: 17/586,428

(22) Filed: Jan. 27, 2022

(65) Prior Publication Data

US 2022/0153930 A1    May 19, 2022

Related U.S. Application Data

(63) Continuation of application No. PCT/EP2020/071317, filed on Jul. 28, 2020.

(30) Foreign Application Priority Data

Jul. 30, 2019 (EP) .................................... 19189100

(51) Int. Cl.
*C08G 73/02* (2006.01)

(52) U.S. Cl.
CPC ............................... *C08G 73/0233* (2013.01)

(58) Field of Classification Search
None
See application file for complete search history.

(56) References Cited

U.S. PATENT DOCUMENTS

| | | | |
|---|---|---|---|
| 6,436,386 B1 * | 8/2002 | Roberts | A61K 47/60 424/78.17 |
| 2008/0182823 A1 * | 7/2008 | Katsumi | A61K 31/67 514/108 |

(Continued)

FOREIGN PATENT DOCUMENTS

WO    WO-2013/103297 A1    7/2013

OTHER PUBLICATIONS

International Search Report and Written Opinion of the International Searching Authority issued for PCT Appl. Ser. No. PCT/EP2020/071317 dated Feb. 4, 2021 (8 pages).

(Continued)

*Primary Examiner* — Tae H Yoon
(74) *Attorney, Agent, or Firm* — Sunit Talapatra; Foley & Lardner LLP (57) ABSTRACT

The present disclosure provides polyoxazoline (POx) copolymers which exhibit very high affinity for calcium ions, are capable of forming hydrogels and are bioresorbable. The polyoxazoline copolymers comprise at least 20 oxazoline units, including at least 4 non-terminal oxazoline units that contain a calcium binding group. Methods of making such polyoxazoline copolymers and using them in biomedical applications are also provided.

13 Claims, 1 Drawing Sheet

Synthetic route of POx-Ale. R was either a hydrogen (EtOx) or methyl group (PropOx).

(56) References Cited

U.S. PATENT DOCUMENTS

2013/0149355 A1 6/2013 Roberts et al.
2016/0130396 A1 5/2016 Manning et al.

OTHER PUBLICATIONS

Lopez-Perez et al., "Self-Healing Hydrogels Formed by Complexation between Calcium Ions and Bisphosphonate-Functionalized Star-Shaped Polymers", Macromolecules, 50(21), 2017, pp. 8698-8706 (9 pages).
Ossipov, "Bisphosphonate-modified biomaterials for drug delivery and bone tissue engineering", Expert Opinion on Drug Delivery, 12(9), 2015, pp. 1443-1458 (17 pages).
Wang et al., "The first pamidronate containing polymer and copolymer", Chemical Communications, 26, 2006, pp. 2795-2797 (4 pages).
Zhang et al., "The Interaction of Cationic Polymers and Their Bisphosphonate Derivatives with Hydroxyapatite", Macromolecular Bioscience, 7(5), 2007, pp. 656-670 (15 pages).

\* cited by examiner

POLYOXAZOLINE COPOLYMER COMPRISING CALCIUM BINDING GROUPS

CROSS-REFERENCE TO RELATED APPLICATIONS

The present application is a Continuation of International Patent Application No. PCT/EP2020/071317, filed Jul. 28, 2020, which claims priority to European Patent Application No. 19189100.1 filed Jul. 30, 2019; the entire contents of all of which are hereby incorporated by reference.

FIELD OF THE INVENTION

The invention relates to polyoxazoline copolymers comprising one or more calcium binding group selected from bisphosphonate, citrate, ethylenediaminetetraacetic acid (EDTA) and combinations thereof.

The polyoxazoline copolymers of the present invention have a very high affinity for calcium ions and are bioresorbable. These polyoxazoline copolymers can advantageously be applied in medical products that are applied onto or in bone tissue, for repair and/or protection of (damaged) bone. Examples of such medical products include barrier membranes, meshes, patches, tapes, fixation devices, hydrogels, bone-setting glue and nanoparticles.

BACKGROUND OF THE INVENTION

Barrier membranes are routinely applied in surgery to allow for regeneration of alveolar bone, while various fixation devices are used in general and trauma surgery to fixate soft tissue to bone (tendon rupture), bone tissue to bone (fractures) or foreign implants to bone tissue (hernia repair with meshes). The current generation of commercially available, degradable barrier membranes and fixation devices has serious shortcomings related to i) a poor control over degradation rates, ii) poor mechanical properties, iii) poor understanding of biological mechanisms governing soft/bone tissue reconstruction and infection, iv) poor clinical manageability and stability, and v) long-term dependence of rigid non-degradable materials.

Currently no biomaterials are available which adhere specifically to bone. Consequently, the development of medical devices which adhere specifically to bone would solve one of the major problems in oral, general and trauma surgery, namely the facile repair of damaged bone and/or fixation of soft or hard tissues to bone.

US 2013/0149355 describes a method to prevent protein and cell adsorption, said method comprising:
 a) providing a water-soluble polymer comprising at one terminus, a hydroxyapatite-targeting moiety;
 b) binding the water-soluble polymer from step (a) with a hydroxyapatite- or calcium phosphate-coated prosthetic or drug delivery device or surface under conditions effective to promote said binding to form a polymeric structure; and
 c) administering the polymeric structure to a bone-containing mammal.

The hydroxyapatite-targeting moiety may be selected from the group consisting of tetracycline, calcein, bisphosphonates, polyaspartic acid, polyglutamic acid, and aminophosphosugars. The water-soluble polymer may be selected from the group consisting of poly(alkyleneglycol), poly(oxyethylated polyol), poly(olefinic alcohol), poly(vinylpyrolidone), poly(hydroxypropylmethacrylamide) poly(α-hydroxy acid), poly(vinyl alcohol), polyphosphazene, polyoxazoline, and copolymers and terpolymers thereof.

Lopez-Perez et al. (*Self-healing hydrogels formed by complexation between calcium ions and bisphosphonate-functionalized star-shaped polymers*, Macromolecules. (2017); 50(21):8698-8706) describe how star-shaped poly(ethylene glycol) (PEG) chain termini were functionalized with alendronate to create transient networks with reversible crosslinks upon addition of calcium ions. The gelation ability of alendronate-functionalized PEG was greatly dependent on the number of arms and arm molecular weight. After mixing polymer and calcium solutions, the formed hydrogels could be cut and then brought back together without any visible interface. Oscillatory rheology showed that the hydrogels recovered between 70 and 100% of the original storage and loss modulus after rupture. Frequency sweep measurements revealed a liquid-like behavior at lower frequencies and solid-like at high frequencies.

Ossipov (*Bisphosphonate-modified biomaterials for drug delivery and bone tissue engineering*, Expert Opin Drug Deliv. (2015); 12(9):1443-1458) reports that strategies of chemical immobilization of bisphosphonates in hydrogels and nanocomposites for bone tissue engineering have emerged that opened new applications of bisphosphonates in bone tissue engineering. Conjugates of bisphosphonates to different drug molecules, imaging agents, proteins and polymers are discussed in terms of specific targeting to bone and therapeutic effect induced. Conversion of these conjugates into hydrogel scaffolds is mentioned along with the application of the resulting materials for bone tissue engineering.

Wang et al. (*The first pamidronate containing polymer and copolymer*, Chemical Communications (2006); 26, 2795-2797) describe the synthesis of poly(N-acryl pamidronate-co-N-isopropylacrylamide).

Zhang et al. (*The interaction of cationic polymers and their bisphosphonate derivatives with hydroxyapatite*, Macromol Biosci. (2007); 7(5), 656-670) describe the construction of a polymeric linker containing multiple copies of BPs for protein conjugation and targeting to bone. Poly(L-lysine) (PLL) and poly(ethylenimine) (PEI) were utilized as the polymeric backbones to incorporate a BP, namely 2-(3-mercaptopropylsulfanyl)-ethyl-1,1-bisphosphonic acid (thiolBP), by using N-hydroxysuccinimidyl polyethylene glycol maleimide and succinimidyl-4-(N-maleimidomethyl)-cyclohexane-1-carboxylate, respectively. In vitro and in vivo mineral affinity of the polymer-BP conjugates were determined in comparison with the unmodified polymers. The in vitro results indicated strong binding of the cationic polymers to HA in their unmodified form. BP conjugation did not enhance the inherent mineral affinity of the polymers; in contrast, certain modifications negatively affected the polymers' binding to the HA. In vivo results from a subcutaneous implant model in rats also showed no significant difference in mineral affinity of the BP modified and unmodified PEI.

SUMMARY OF THE INVENTION

The inventors have developed a novel biocompatible polymer that exhibits very high affinity for calcium ions. The polymer of the present invention is a polyoxazoline (POx) copolymer comprising at least 20 oxazoline units, including at least 4 non-terminal oxazoline units that contain a calcium binding group selected from bisphosphonate, citrate, ethylenediaminetetraacetic acid (EDTA) and combinations thereof.

The POx copolymers of the present invention are capable of forming hydrogels due to reversible cross-linking with $Ca^{2+}$ ions. The POx copolymers of the present invention offer the important advantage that they are bioresorbable. Through the grafting of calcium binding groups to the backbone of the POx copolymer, the copolymer can attain very useful bone-adhesive properties.

Furthermore, calcium affinity, biodegradability and hydrogel characteristics of the POx copolymer can easily be tuned due to the fact that POx can easily be derivatised along the entire polymeric backbone and not only at the end-groups.

The POx copolymers of the present invention may suitably be applied in a variety of biomedical applications, such as barrier membranes, bone fixation devices, bone implants, (injectable) hydrogels, bone-setting glue and nanoparticles.

DETAILED DESCRIPTION OF THE INVENTION

Accordingly, a first aspect of the present invention relates to a polyoxazoline (POx) copolymer comprising at least 20 oxazoline units, including at least 4 non-terminal oxazoline units that contain a calcium binding group selected from bisphosphonate, citrate, ethylenediaminetetraacetic acid (EDTA) and combinations thereof.

The term "oxazoline unit" as used herein refers to a monomeric unit that is contained in the POx copolymer and that is derived from oxazoline or a substituted oxazoline.

The term "calcium binding group" as used herein refers to a group that is capable of forming two or more separate coordinate bonds with $Ca^{2+}$ ions.

The POx copolymer of the present invention preferably comprises at least 30 oxazoline units, more preferably at least 40 oxazoline units, even more preferably 50 to 400 oxazoline units, most preferably 60 to 200 oxazoline units.

Besides oxazoline units, the POx copolymer may also contain other monomeric units. Oxazoline units preferably constitute at least 50 wt. %, more preferably at least 80 wt. %, even more preferably at least 90 wt. % and most preferably at least 95 wt. % of the monomeric units that are contained in the present POx copolymer.

The POx copolymer of the present invention preferably is a linear, i.e. non-branched, copolymer.

The present POx copolymer can be a statistical copolymer, an alternating copolymer, a gradient copolymer or a block copolymer. Preferably, the POx copolymer is a statistical copolymer or a block copolymer. Most preferably, the POx copolymer is a statistical copolymer.

The affinity of the present POx copolymer to hydroxyapatite is dependent on the number of calcium binding groups in the copolymer. Preferably, the copolymer contains at least 6 non-terminal oxazoline units that contain a calcium binding group. More preferably, the copolymer contains at least 8 non-terminal oxazoline units, most preferably at least 10 non-terminal oxazoline units that contain a calcium binding group.

Oxazoline units containing a calcium binding group preferably represent 3-50% of the monomeric units contained in the POx copolymer. More preferably, the calcium binding group containing oxazoline units represent 4-40%, most preferably 5-35% of the monomeric units contained in the POx copolymer.

According to a particularly preferred embodiment, the POx copolymer comprises:
repeating units A of formula —$[N(R^a)CH_2CH_2]$—; and
repeating units B of formula —$[N(R^b)CH_2CH_2]$—;
wherein:
$R^a$ is CO—$(CHR^1)_t$—H
$R^b$ is CO—$(CHR^1)_t$—CONH—$R^2$—X—CO—$(CHR^3)_u$—CONR$^4$—CO-ccr
$R^1$ represents H or optionally substituted $C_{1-5}$ alkyl;
$R^2$ represents an optionally substituted $C_{1-5}$ alkylene;
$R^3$ represents H or optionally substituted $C_{1-5}$ alkyl;
$R^4$ represents H or $CH_3$;
X represents O, $NR^{11}$, S or $^+NR^{11}(R^{12})$;
$R^{11}$ and $R^{12}$ represent H, methyl or ethyl;
t represents 1, 2 or 3;
u represents 1, 2 or 3;
ccr represents a calcium binding group.

In a preferred embodiment, the calcium binding group (ccr in the formula representing repeating units B) represents a group comprising bisphosphonate. Even more preferably, the calcium binding group (ccr) represents a group comprising bisphosphonate that is represented by formula (I):

-(L)C(Z)(PO$_3$H$_2$)$_2$         (I)

or a pharmaceutically acceptable salt thereof;
wherein:
L represents an optionally substituted $C_{1-5}$ alkylene;
Z represents H, OH, Cl, F or a methyl group.

In the above mentioned formula (I), L preferably represents $C_{2-4}$ alkylene. Most preferably, L represents propylene.

In formula (I), Z preferably represents H, OH or a methyl group. Most preferably, Z represents OH.

It was found that the hydrogel-forming properties of the POx copolymer of the present invention can be improved by incorporating oxazoline units that carry a carboxylate group. Thus, in accordance with a particularly preferred embodiment, the copolymer additionally comprises:
repeating units C of formula —$[N(R^c)CH_2CH_2]$—
wherein:
$R^c$ is CO—$(CHR^1)_t$—CONH—$R^2$—X—CO—$R^5$-cbx
$R^5$ represents an optionally substituted $C_{1-5}$ alkylene
cbx represents a carboxylate containing group;
$R^1$, $R^2$, t and X having the same meaning as described herein before.

Preferably, cbx in the formula of repeating unit C represents COOH or COO$^-$M$^+$, wherein M represents a monovalent metal cation or NH$_4^+$, most preferably cbx represents COOH, COO$^-$Na$^+$ or COO$^-$K$^+$.

The properties of the present POx copolymer can also be manipulated in a favourable manner by incorporating oxazoline units that affect the polarity of the copolymer. Thus, preferably the POx copolymer additionally comprises:
repeating units D of formula —$[N(R^d)CH_2CH_2]$—
wherein:
$R^d$ is CO—$(CHR^1)_t$—CONH—$R^2$—X—$R^6$—;
$R^6$ represents H, methyl or ethyl;
$R^1$, $R^2$, t and X having the same meaning as described herein before.

The POx copolymer may advantageously comprise oxazoline units that carry groups that impart collagen-adhesive properties to the copolymer. Thus, a POx copolymer may be provided that has affinity for both inorganic and organic components of bone tissue. Collagen-adhesive properties may be imparted by oxazoline units that carry a N-hydroxysuccinimidyl group. Thus, in a particularly preferred embodiment, the POx copolymer additionally comprises:

repeating units E of formula —[N(R$^e$)CH$_2$CH$_2$]—
wherein:
R$^e$ is CO—(CHR$^1$)$_t$—CONH—R$^2$—X—CO—R$^5$—CO-nhs
nhs represents a N-hydroxysuccinimidyl group
R$^1$, R$^2$, R$^5$, t and X having the same meaning as mentioned above.

The properties of the POx copolymer may be further tuned by the presence of oxazoline units that do not carry a pendant group. Accordingly, in another preferred embodiment, the POx-copolymer additionally comprises:

repeating units F of formula —[NHCH$_2$CH$_2$]—.

According to a preferred embodiment, R$^1$ in the above-mentioned formulae of the repeating units A, B, C and D represents H.

The integer t in the formulae of the repeating units A, B, C and D preferably is 2 or 3.

In the formulae of the repeating units B, C and D, R$^2$ preferably represents ethylene.

The integer u in the formula of the repeating unit B preferably is 2 or 3.

R$^3$ in the formula of repeating unit B preferably represents H.

R$^4$ in the formula of repeating unit B preferably represents H.

In the formulae of repeating units B, C and D, X preferably represents O.

R$^5$ in the formula of repeating unit C, preferably represents ethylene.

R$^6$ in the formulate of repeating unit D, preferably represents H.

According to particularly preferred embodiment, the POx copolymer of the present invention has the following monomeric composition:

40-97 mol. % of repeating units A
3-50 mol. % of repeating units B
0-40 mol. % of repeating units C
0-50 mol. % of repeating units D
0-10 mol. % of repeating units E
0-10 mol. % of repeating units F.

Even more preferably, the POx copolymer has the following composition:

50-95 mol. % of repeating units A
4-40 mol. % of repeating units B
0.3-35 mol. % of repeating units C
0-45 mol. % of repeating units D
0-8 mol. % of repeating units E
0-8 mol. % of repeating units F.

Most preferably, the POx copolymer has the following composition.

55-92 mol. % of repeating units A
5-35 mol. % of repeating units B
0.5-32 mol. % of repeating units C
0-30 mol. % of repeating units D
0-5 mol. % of repeating units E
0-5 mol. % of repeating units F.

Together, the repeating units A and B preferably constitute at least 55%, more preferably at least 65% and most preferably at least 70% of the monomeric units present in the POx copolymer.

Together, the repeating units A, B, C, D and E preferably constitute at least 60%, more preferably at least 80% and most preferably at least 90% of the monomeric units present in the POx copolymer.

The total number of repeating units A, B, C, D and E in the copolymer preferably is in the range of 40 to 200, more preferably in the range of 60 to 150.

Another aspect of the present invention relates to the use of the POx copolymer of the present invention for imparting bone adhesiveness to a medical product.

Yet another aspect of the invention relates to a biocompatible medical product containing the POx copolymer of the present invention.

Examples of medical products in which the POx copolymer may be applied include barrier membranes, meshes, patches, tapes, bone fixation devices, bone implants, hydrogels, bone glues and therapeutic nanoparticles.

In an embodiment of the invention, the medical product is not an haemostatic product, such as a haemostatic patch, and does not comprise oxidised regenerated cellulose.

Yet another aspect of the invention relates to a process of preparing a POx copolymer as described herein before, said process comprising:

(a) cationic ring opening polymerization of a mixture comprising the following 2-oxazoline monomers A and B:

(A)

(B)

wherein R$^1$ and t have the same meaning as in claim 1, and wherein R$^{11}$ represents an optionally substituted C$_{1-5}$ alkyl;

(b) amidation of at least some of the alkylcarboxy groups of the intermediate polyoxazoline copolymer by reacting said groups with an amine represented by the following formula: H$_2$N—R$^2$—X—H; wherein R$^2$ and X have the same meaning as described herein before;

(c) functionalization of at least some of the amidated groups by reacting said groups with succinic anhydride;

(d) activation of at least some of the functionalized groups by reacting said groups with N-hydroxysuccinimide; and (e) introduction of calcium scavenging functionality by reacting at least some of the activated groups with a reactant comprising a calcium binding group.

According to a preferred embodiment, R$^{11}$ in oxazoline monomer B represents methyl.

Preferably, the calcium binding functionality is introduced by reacting the activated groups with a calcium binding agent, more preferably a calcium binding agent selected from bisphosphonate, citrate and EDTA. Most preferably, the calcium binding functionality is introduced by reacting the activated groups with alendronate or pamidronate.

After polymerization, the 2-oxazoline monomers A form the aforementioned oxazoline units A in the POx copolymer.

Oxazoline units B are formed in the final step, i.e. step (e) of the process. Oxazoline units C are formed in step (c). Oxazoline units D are formed in step (b). Oxazoline units E are formed in step (d).

It will be understood that the percentages of oxazoline units B, C, D and E in the final POx copolymer can be manipulated by controlling the level of derivatization in each of steps (b), (c), (d) and (e).

Oxazoline units F can be formed by hydrolyzing the polyoxazoline copolymer that is formed after any one of steps (a) to (e). Preferably, this hydrolysis is carried out between steps (a) and (b).

The invention is further illustrated by the following non-limiting examples.

EXAMPLES

Materials 2-ethyl-2-oxazoline (EtOx) was obtained from Sigma-Aldrich.

2-n-propyl-2-oxazoline (PropOx) was synthesised as described by Hoogenboom et al. (*Microwave-assisted synthesis and properties of a series of poly(2-alkyl-2-oxazoline)s*, Des. Monomers Polym. (2005), 8, 659-671).

2-methoxycarbonylethyl-2-oxazoline (MestOx) was synthesised as described by Bouten et al. (*Accelerated living cationic ring-opening polymerization of a methyl ester functionalized 2-oxazoline monomer*, Polym. Chem. (2015), 6, 514-518).

Acetonitrile and tetrahydrofuran were discharged under nitrogen atmosphere using an MBraun MB SPS-800 solvent dispersing system.

Anhydrous dichloromethane (DCM), anhydrous diethyl ether, HPLC grade methanol, and fused calcium chloride were obtained from Fisher Scientific.

Anhydrous N,N-dimethylformamide (DMF) was obtained from Acros Organics.

Dowex© 50WX4 100-200 (H) and succinic anhydride were obtained from Alfa Aesar.

N-(3-dimethylaminopropyl)-N'-ethylcarbodiimide hydrochloride (EDC), 4-dimethylamino pyridine (DMAP), N,N-diisopropylcarbodiimide (DIC), N-hydroxysuccinimide (NHS), and sodium alendronate trihydrate (Ale) were obtained from Fluorochem.

Dimethyl sulfoxide, 2-ethanolamine, methyl-p-toluenesulfonate (MeOTs), and α-cyano-4-hydroxycinnamic acid (CHCA) were obtained from Sigma-Aldrich.

Deuterated solvents as deuterium oxide, chloroform-d, and dimethyl sulfoxide-d6 were obtained from Cambridge Isotope Laboratories and Sigma Aldrich.

Ultrapure Milli-Q water set to 18.2 MO/cm was obtained from a WaterPro PS polisher (Labconco, Kansas City, MO).

Dialysis membranes Spectra/Por® 3 (3.5 kD cutoff) were obtained from VWR International.

Phosphate buffered saline (PBS) solution was prepared containing 2.7 mM KCl, 137 mM NaCl, 2 mM $KH_2PO_4$, and 8 mM $Na_2HPO_4$ (pH=7.4).

Polyvinylpyrrolidone K 90 (PVP) was obtained from Sigma-Aldrich.

Poly(2-ethyl-2-oxazoline) average Mw ~50,000, PDI 3-4 was obtained from Sigma-Aldrich.

Pluronic (Kolliphor® P188/Lutrol-F68) was obtained from BASF.

Hydroxyapatite (Calcium Phosphate, CaP) was obtained from Merck.

Synthesis of Alendronate-Functionalized Poly(2-Oxazoline)s.

Figure 1:
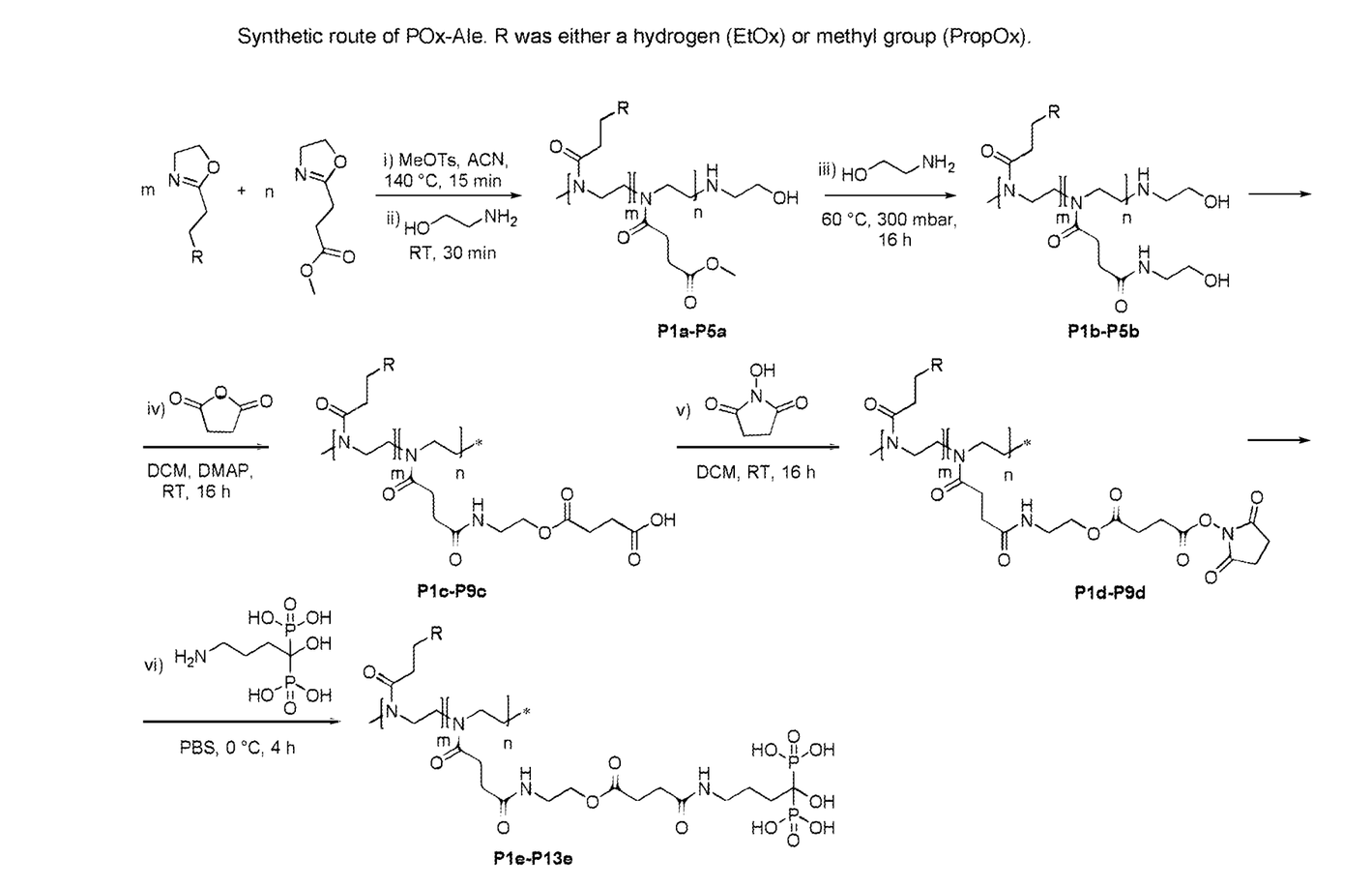
FIG. 1 shows the synthetic route of alendronate-functionalized poly(2-oxazoline)s as synthesized in five steps.

Alendronate-functionalized poly(2-oxazoline)s were synthesized in five steps as shown in FIG. 1.

2-methoxycarbonylethyl-2-oxazoline (MestOx) was copolymerized either with 2-ethyl-2-oxazoline (EtOx) or n-propyl-2-oxazoline (PropOx) to yield randomly distributed statistical copolymers with different polarity. Methyl-p-toluenesulfonate (1 equiv), either EtOx (m equiv) or PropOx (m equiv), MestOx (n equiv), and dry acetonitrile (4 M) were mixed under inert atmosphere in the desired ratios in microwave vials. The polymerization was carried out under microwave irradiation at 140° C. for 15 min following a cationic ring opening mechanism (CROP). After polymerization, the reaction was terminated by the addition of ethanolamine (10 equiv) stirring for 30 min at room temperature. Then, the solvent was evaporated in vacuo to afford either P(EtOx-ran-MestOx) or P(PropOx-ran-MestOx) copolymers P1a-P5a.

The MestOx copolymers P1a-P5a (1 equiv) were modified by direct amidation with 2-ethanolamine (3.5 equiv) at 60° C. under reduced pressure (300 mbar) for 16 h. Then, the crude mixtures were purified by three consecutive precipitations in a mixture of acetone:ether v/v 3:1 and re-dissolved in DCM:MeOH v/v 8:2, followed by ion-exchange chromatography in MeOH. Finally, the solvents were evaporated under vacuum to afford either P(EtOx-OH) or P(PropOx-OH) copolymers P1b-P5b in the desired ratios.

These hydroxyl side-functionalized polymers P1b-P5b (1 equiv) were either fully or partially converted to carboxylic acid moieties using succinic anhydride (1.1 equiv), 4-dimethylamino pyridine (DMAP) (1.1 equiv), and dissolved in DCM:DMF v/v 9:1 (2 M) under argon atmosphere for 16 h. The crude mixtures were purified by three consecutive precipitations in acetone and re-dissolved in DCM:MeOH v/v 8:2, followed by ion-exchange chromatography in MeOH. Finally, the solvent was evaporated under vacuum to afford either P(EtOx/PropOx-COOH) or P(EtOx/PropOx-OH—COOH) P1c-P9c in the desired ratios.

These carboxylate side-functionalized copolymers were subsequently modified into reactive esters by carbodiimide coupling with N-hydroxysuccinimide. The functionalized polymers were dissolved in DCM:DMF v/v 95:5 (0.2 M), N-hydroxysuccinimide (1.1 equiv) and N,N-diisopropylcarbodiimide (1.2 equiv) as coupling agent were added, and stirred under argon atmosphere at room temperature for 16 h. They were purified by two precipitations in acetone:ether v/v 1:1 followed by other in ether, and re-dissolved in DCM. Finally, the solvents were evaporated under vacuum to afford P(EtOx/PropOx-OH—NHS) or P(EtOx/PropOx-NHS) P1d-P9d.

Alendronate moieties were incorporated in the polymer side chain by an amidation reaction. The NHS-activated copolymers P1d-P9d (1 equiv) were slowly added into a solution containing sodium alendronate trihydrate (2 equiv), N-hydroxysuccinimide (1 equiv) and N-(3-dimethylaminopropyl)-N'-ethylcarbodiimide hydrochloride (1 equiv) in phosphate buffered saline (0.5 M), stirring at 3° C. for 4 h with the pH previously adjusted to 7.7 using NaOH. Afterwards, the mixtures were dialyzed for 16 h, follow by three precipitations in acetone:ether v/v 3:1, and re-dissolved in demi-water. Finally, they were lyophilized to afford either P(EtOx/PropOx-Ale), P(EtOx/PropOx-OH-Ale), or P(EtOx/PropOx-COOH-Ale) copolymers P1e-P13e in the desired ratios.

Example 1

Synthesis of $P(EtOx_{90}\text{-}Ale_{10})$—P1e
$P(EtOx_{90}\text{-}MestOx_{10})$ P1a According to the general procedure, the reaction of a solution of methyl tosylate (0.68 mL, 4.52 mmol), 2-ethyl-2-oxazoline (41.04 mL, 406.59 mmol) and 2-methoxycarbonylethyl-2-oxazoline (6.23 mL, 45.18 mmol) in dry acetonitrile (68 mL, 4 M), terminated by the addition of 2-ethanolamine (2.72 mL, 45.18 mmol) afforded the desired polymer P1a (52.12 g, 4.39 mmol). $^1$H NMR [400 MHz, δ (ppm), CDCl$_3$]: 3.63 (br, 3H, 5-CH$_3$), 3.65-3.35 (br, 8H, 1-CH$_2$), 2.70-2.50 (br, 4H, 4-CH$_2$), 2.50-2.20 (br, 2H, 2-CH$_2$), 0.95-1.15 (br, 3H, 3-CH$_3$). Experimentally determined copolymer ratio: m/n 90:10. SEC: M$_n$ 10.6 kDa, Đ 1.11. MALDI-TOF: M$_n$ 9.7 kDa. Yield: 97%.

P(EtOx$_{90}$-OH$_{10}$) P1b

According to the general procedure, the reaction of P1a (43 g, 4.07 mmol) with 2-aminoethanol (8.60 mL, 142.40 mmol) afforded the desired polymer P1b (38.05 g, 3.50 mmol). $^1$H NMR [400 MHz, δ (ppm), D$_2$O]: 3.65 (br, 2H, 7-CH$_2$), 3.75-3.45 (br, 8H, 1-CH$_2$), 3.35-3.25 (br, 2H, 6-CH$_2$), 2.75-2.60 (br, 2H, 5-CH$_2$), 2.60-2.40 (br, 2H, 4-CH$_2$), 2.45-2.25 (br, 2H, 2-CH$_2$), 1.00-0.80 (br, 3H, 3-CH$_3$). Experimentally determined copolymer ratio: m/n 90:10. MALDI-TOF: M$_n$ 10.2 kDa. Yield: 86%.

P(EtOx$_{90}$-COOH$_{10}$) P1c

According to the general procedure, the reaction of a solution of P1b (38 g, 3.50 mmol), 4-dimethylamino pyridine (0.86 g, 7.00 mmol) and succinic anhydride (4.20 g, 41.98 mmol) in DCM/ACN 9:1 (27 mL, 2 M) afforded the desired polymer P1c (36.01 g, 3.03 mmol). $^1$H NMR [400 MHz, δ (ppm), D$_2$O]: 4.25-4.15 (br, 2H, 7-CH$_2$), 3.70-3.40 (br, 10H, 1-CH$_2$+6-CH$_2$), 2.75-2.60 (br, 6H, 5-CH$_2$+8-CH$_2$), 2.60-2.45 (br, 2H, 4-CH$_2$), 2.40-2.25 (br, 2H, 2-CH$_2$), 1.10-0.95 (br, 3H, 3-CH$_3$). Experimentally determined copolymer ratio: m/o 90:10. MALDI-TOF: M$_n$ 11.1 kDa. Yield: 87%.

P(EtOx$_{90}$-NHS$_{10}$) P1d

According to the general procedure, the reaction of a solution of P1c (6 g, 0.51 mmol), N-hydroxysuccinimide (0.64 g, 5.57 mmol) and N,N-diisopropylcarbodiimide (0.94 mL, 6.07 mmol) in DCM/ACN 9:1 (60 mL, 0.2 M) afforded the desired polymer P1d (5.65 g, 0.44 mmol). $^1$H NMR [400 MHz, δ (ppm), DMSO-d$_6$]: 4.00-3.90 (br, 2H, 7-CH$_2$), 3.50-3.10 (br, 10H, 1-CH$_2$+6-CH$_2$), 2.90-2.85 (br, 2H, 8-CH$_2$), 2.75-2.70 (br, 4H, 9-CH$_2$), 2.65-2.60 (br, 2H, 8-CH$_2$), 2.60-2.40 (br, 2H, 5-CH$_2$), 2.30-2.10 (br, 4H, 2-CH$_2$+4-CH$_2$), 0.85-0.70 (br, 3H, 3-CH$_3$). Experimentally determined copolymer ratio: m/o 90:10. SEC: M$_n$ 11.7 kDa, Đ 1.25. MALDI-TOF: M$_n$ 11.5 kDa. Yield: 87%.

P(EtOx$_{90}$-Ale$_{10}$) P1e

According to the general procedure, the reaction of a solution of P1d (5.0 g, 0.39 mmol), sodium alendronate trihydrate (2.53 g, 7.79 mmol), N-hydroxysuccinimide (0.45 g, 3.90 mmol) and N-(3-dimethylaminopropyl)-N'-ethylcarbodiimide hydrochloride (0.75 g, 3.90 mmol) in PBS (32 mL, 0.5 M) afforded the desired polymer P1e (1.29 g, 0.09 mmol). $^1$H NMR [400 MHz, δ (ppm), D$_2$O]: 4.30-4.10 (br, 4H, 7-CH$_2$), 3.75-3.40 (br, 16H, 1-CH$_2$+6-CH$_2$), 3.30-3.20 (br, 2H, 9-CH$_2$), 2.75-2.45 (br, 16H, 4-CH$_2$+5-CH$_2$+8-CH$_2$), 2.45-2.20 (br, 2H, 2-CH$_2$), 2.05-1.75 (br, 4H, 10-CH$_2$+11-CH$_2$), 1.15-0.95 (br, 3H, 3-CH$_3$). $^{31}$P NMR [400 MHz, δ (ppm), D$_2$O]: 18.19. Experimentally determined copolymer ratio: m/o/p 90:1:9. MALDI-TOF: M$_n$ 12.0 kDa. Yield: 24%.

Example 2

Synthesis of P(EtOx$_{80}$-Ale$_{20}$)—P2e
P(EtOx$_{80}$-MestOx$_{20}$) P2a

According to the general procedure, the reaction of a solution of methyl tosylate (0.46 mL, 3.01 mmol), 2-ethyl-2-oxazoline (24.32 mL, 240.94 mmol) and 2-methoxycarbonylethyl-2-oxazoline (8.31 mL, 60.24 mmol) in dry acetonitrile (43 mL, 4 M), terminated by the addition of 2-ethanolamine (1.82 mL, 30.12 mmol) afforded the desired polymer P2a (36.22 g, 2.93 mmol). $^1$H NMR [400 MHz, δ (ppm), CDCl$_3$]: 3.65 (br, 3H, 5-CH$_3$), 3.65-3.35 (br, 8H, 1-CH$_2$), 2.75-2.50 (br, 4H, 4-CH$_2$), 2.50-2.20 (br, 2H, 2-CH$_2$), 0.95-1.15 (br, 3H, 3-CH$_3$). Experimentally determined copolymer ratio: m/n 80:20. SEC: M$_n$ 9.6 kDa, Đ: 1.17. MALDI-TOF: M$_n$ 9.8 kDa. Yield: 97%.

P(EtOx$_{80}$-OH$_{20}$) P2b

According to the general procedure, the reaction of P2a (34 g, 3.05 mmol) with 2-aminoethanol (12.88 mL, 213.47 mmol) afforded the desired polymer P2b (31.46 g, 2.64 mmol). $^1$H NMR [400 MHz, δ (ppm), D$_2$O]: 3.65 (br, 2H, 7-CH$_2$), 3.75-3.45 (br, 8H, 1-CH$_2$), 3.35-3.25 (br, 2H, 6-CH$_2$), 2.80-2.60 (br, 2H, 5-CH$_2$), 2.60-2.50 (br, 2H, 4-CH$_2$), 2.50-2.25 (br, 2H, 2-CH$_2$), 1.00-0.80 (br, 3H, 3-CH$_3$). Experimentally determined copolymer ratio: m/n 80:20. MALDI-TOF: M$_n$ 9.9 kDa. Yield: 87%.

P(EtOx$_{80}$-COOH$_{20}$) P2c

According to the general procedure, the reaction of a solution of P2b (31 g, 2.64 mmol), 4-dimethylamino pyridine (1.29 g, 10.56 mmol) and succinic anhydride (6.34 g, 63.38 mmol) in DCM/ACN 9:1 (38 mL, 2 M) afforded the desired polymer P2c (29.74 g, 2.18 mmol). $^1$H NMR [400 MHz, δ (ppm), D$_2$O]: 4.25-4.15 (br, 2H, 7-CH$_2$), 3.70-3.40 (br, 10H, 1-CH$_2$+6-CH$_2$), 2.75-2.55 (br, 6H, 5-CH$_2$+8-CH$_2$), 2.50-2.45 (br, 2H, 4-CH$_2$), 2.40-2.25 (br, 2H, 2-CH$_2$), 1.10-0.95 (br, 3H, 3-CH$_3$). Experimentally determined copolymer ratio: m/o 80:20. MALDI-TOF: M$_n$ 11.2 kDa. Yield: 83%.

P(EtOx$_{80}$-NHS$_{20}$) P2d

According to the general procedure, the reaction of a solution of P2c (33 g, 2.40 mmol), N-hydroxysuccinimide (6.08 g, 52.87 mmol) and N,N'-diisopropylcarbodiimide (8.93 mL, 57.67 mmol) in DCM/ACN 9:1 (556 mL, 0.2 M) afforded the desired polymer P2d (35.63 g, 2.27 mmol). $^1$H NMR [400 MHz, δ (ppm), DMSO-d$_6$]: 4.00-3.90 (br, 2H, 7-CH$_2$), 3.50-3.10 (br, 10H, 1-CH$_2$+6-CH$_2$), 2.90-2.85 (br, 2H, 8-CH$_2$), 2.75-2.70 (br, 4H, 9-CH$_2$), 2.65-2.60 (br, 2H, 8-CH$_2$), 2.60-2.40 (br, 2H, 5-CH$_2$), 2.30-2.10 (br, 4H, 2-CH$_2$+4-CH$_2$), 0.85-0.70 (br, 3H, 3-CH$_3$). Experimentally determined copolymer ratio: m/o 80:20. SEC: M$_n$ 12.6 kDa, Đ 1.21. MALDI-TOF: M$_n$ 13.0 kDa. Yield: 95%.

P(EtOx$_{80}$-Ale$_{20}$) P2e

According to the general procedure, the reaction of a solution of P2d (15 g, 0.96 mmol), sodium alendronate trihydrate (12.45 g, 38.28 mmol), N-hydroxysuccinimide (2.20 g, 19.14 mmol) and N-(3-dimethylaminopropyl)-N'-ethylcarbodiimide hydrochloride (3.67 g, 19.14 mmol) in PBS (155 mL, 0.5 M) afforded the desired polymer P2e (5.47 g, 0.30 mmol). $^1$H NMR [400 MHz, δ (ppm), D$_2$O]: 4.25-4.10 (br, 4H, 7-CH$_2$), 3.80-3.35 (br, 16H, 1-CH$_2$+6-CH$_2$), 3.30-3.20 (br, 2H, 9-CH$_2$), 2.75-2.45 (br, 16H, 4-CH$_2$+5-CH$_2$+8-CH$_2$), 2.45-2.25 (br, 2H, 2-CH$_2$), 2.05-1.75 (br, 4H, 10-CH$_2$+11-CH$_2$), 1.15-0.95 (br, 3H, 3-CH$_3$). Experimentally determined copolymer ratio: m/o/p 80:1:19. $^{31}$P NMR [400 MHz, δ (ppm), D$_2$O]: 18.15. MALDI-TOF: M$_n$ 15.0 kDa. Yield: 31%.

Example 3

Synthesis of P(EtOx$_{70}$-Ale$_{30}$)—P3e
P(EtOx$_{80}$-MestOx$_{20}$) P2a

According to the general procedure, the reaction of a solution of methyl tosylate (0.46 mL, 3.01 mmol), 2-ethyl-2-oxazoline (24.32 mL, 240.94 mmol) and 2-methoxycarbonylethyl-2-oxazoline (8.31 mL, 60.24 mmol) in dry acetonitrile (43 mL, 4 M), terminated by the addition of 2-ethanolamine (1.82 mL, 30.12 mmol) afforded the desired polymer P2a (36.22 g, 2.93 mmol). $^1$H NMR [400 MHz, δ (ppm), CDCl$_3$]: 3.65 (br, 3H, 5-CH$_3$), 3.65-3.35 (br, 8H, 1-CH$_2$), 2.75-2.50 (br, 4H, 4-CH$_2$), 2.50-2.20 (br, 2H, 2-CH$_2$), 0.95-1.15 (br, 3H, 3-CH$_3$). Experimentally determined copolymer ratio: m/n 80:20. SEC: M$_n$ 9.6 kDa, Đ: 1.17. MALDI-TOF: M$_n$ 9.8 kDa. Yield: 97%.

P(EtOx$_{70}$-OH$_{30}$) P3b

According to the general procedure, the reaction of P3a (51 g, 4.35 mmol) with 2-aminoethanol (27.55 mL, 456.55 mmol) afforded the desired polymer P3b (43.98 g, 3.49 mmol). $^1$H NMR [400 MHz, δ (ppm), D$_2$O]: 3.66 (br, 2H, 7-CH$_2$), 3.75-3.45 (br, 8H, 1-CH$_2$), 3.35-3.25 (br, 2H, 6-CH$_2$), 2.75-2.60 (br, 2H, 5-CH$_2$), 2.60-2.50 (br, 2H, 4-CH$_2$), 2.45-2.25 (br, 2H, 2-CH$_2$), 1.00-0.80 (br, 3H, 3-CH$_3$). Experimentally determined copolymer ratio: m/n 70:30. MALDI-TOF: M$_n$ 11.1 kDa. Yield: 80%.

P(EtOx$_{70}$-COOH$_{30}$) P3c

According to the general procedure, the reaction of a solution of P3b (10 g, 0.79 mmol), 4-dimethylamino pyridine (0.58 g, 4.76 mmol) and succinic anhydride (2.86 g, 28.54 mmol) in DCM/ACN 9:1 (17 mL, 2 M) afforded the desired polymer P3c (9.85 g, 0.64 mmol). $^1$H NMR [400 MHz, δ (ppm), D$_2$O]: 4.25-4.15 (br, 2H, 7-CH$_2$), 3.80-3.45 (br, 10H, 1-CH$_2$+6-CH$_2$), 2.75-2.60 (br, 6H, 5-CH$_2$+8-CH$_2$), 2.60-2.45 (br, 2H, 4-CH$_2$), 2.40-2.25 (br, 2H, 2-CH$_2$), 1.15-1.00 (br, 3H, 3-CH$_3$). Experimentally determined copolymer ratio: m/o 70:30. MALDI-TOF: M$_n$ 13.5 kDa. Yield: 81%.

P(EtOx$_{70}$-NHS$_{30}$) P3d

According to the general procedure, the reaction of a solution of P3c (61 g, 3.91 mmol), N-hydroxysuccinimide (14.85 g, 129.00 mmol) and N,N'-diisopropylcarbodiimide (21.79 mL, 140.72 mmol) in DCM/ACN 9:1 (1346 mL, 0.2 M) afforded the desired polymer P3d (57.06 g, mmol). $^1$H NMR [400 MHz, δ (ppm), DMSO-d$_6$]: 4.00-3.90 (br, 2H, 7-CH$_2$), 3.50-3.10 (br, 10H, 1-CH$_2$+6-CH$_2$), 2.90-2.85 (br, 2H, 8-CH$_2$), 2.75-2.70 (br, 4H, 9-CH$_2$), 2.65-2.60 (br, 2H, 8-CH$_2$), 2.60-2.40 (br, 2H, 5-CH$_2$), 2.30-2.10 (br, 4H, 2-CH$_2$+4-CH$_2$), 0.85-0.70 (br, 3H, 3-CH$_3$). Experimentally determined copolymer ratio: m/o 70:30. SEC: M$_n$ 15.6 kDa, Đ 1.25. MALDI-TOF: M$_n$ 16.9 kDa. Yield: 79%.

P(EtOx$_{70}$-Ale$_{30}$) P3e

According to the general procedure, the reaction of a solution of P3d (15 g, 0.81 mmol), sodium alendronate trihydrate (15.80 g, 48.61 mmol), N-hydroxysuccinimide (2.80 g, 24.31 mmol) and N-(3-dimethylaminopropyl)-N'-ethylcarbodiimide hydrochloride (4.66 g, 24.31 mmol) in PBS (66 mL, 0.5 M) afforded the desired polymer P3e (5.81 g, 0.26 mmol). $^1$H NMR [400 MHz, δ (ppm), D$_2$O]: 4.25-4.10 (br, 4H, 7-CH$_2$), 3.80-3.30 (br, 16H, 1-CH$_2$+6-CH$_2$), 3.25-3.15 (br, 2H, 9-CH$_2$), 2.75-2.45 (br, 16H, 4-CH$_2$+5-CH$_2$+8-CH$_2$), 2.45-2.15 (br, 2H, 2-CH$_2$), 2.15-1.70 (br, 4H, 10-CH$_2$+11-CH$_2$), 1.15-0.95 (br, 3H, 3-CH$_3$). $^{31}$P NMR [400 MHz, δ (ppm), D$_2$O]: 18.25. Experimentally determined copolymer ratio: m/o/p 70:2:28. MALDI-TOF: M$_n$ 19.5 kDa. Yield: 32%.

Example 4

Synthesis of P(PropOx$_{90}$-Ale$_{10}$)—P4e

P(PropOx$_{90}$-MestOx$_{10}$) P4a

According to the general procedure, the reaction of a solution of methyl tosylate (0.57 mL, 3.76 mmol), n-propyl-2-oxazoline (37.59 mL, 338.82 mmol) and 2-methoxycarbonylethyl-2-oxazoline (5.19 mL, 37.65 mmol) in dry acetonitrile (52 mL, 4 M), terminated by the addition of 2-ethanolamine (2.72 mL, 37.65 mmol) afforded the desired polymer P4a (42.08 g, 3.55 mmol). $^1$H NMR [400 MHz, δ (ppm), CDCl$_3$]: 3.65 (br, 3H, 6-CH$_3$), 3.65-3.35 (br, 8H, 1-CH$_2$), 2.70-2.50 (br, 4H, 5-CH$_2$), 2.40-2.10 (br, 2H, 2-CH$_2$), 1.70-1.50 (br, 2H, 3-CH$_2$), 1.00-0.80 (br, 3H, 4-CH$_3$). Experimentally determined copolymer ratio: m/n 90:10. SEC: M$_n$ 10.2 kDa, Đ 1.08. MALDI-TOF: M$_n$ 10.4 kDa. Yield: 94%.

P(PropOx$_{90}$-OH$_{10}$) P4b

According to the general procedure, the reaction of P4a (42 g, 3.55 mmol) with 2-aminoethanol (21.43 mL, 354.99 mmol) afforded the desired polymer P4b (34.49 g, 2.80 mmol). $^1$H NMR [400 MHz, δ (ppm), D$_2$O]: 3.65 (br, 2H, 8-CH$_2$), 3.75-3.45 (br, 8H, 1-CH$_2$), 3.35-3.30 (br, 2H, 7-CH$_2$), 2.75-2.60 (br, 2H, 6-CH$_2$), 2.60-2.50 (br, 2H, 5-CH$_2$), 2.45-2.25 (br, 2H, 2-CH$_2$), 1.65-1.50 (br, 2H, 3-CH$_2$), 1.00-0.80 (br, 3H, 4-CH$_3$). Experimentally determined copolymer ratio: m/n 90:10. MALDI-TOF: M$_n$ 10.7 kDa.

Yield: 79%.

P(PropOx$_{90}$-COOH$_{10}$) P4c

According to the general procedure, the reaction of a solution of P4b (28 g, 2.31 mmol), 4-dimethylamino pyridine (0.56 g, 4.62 mmol) and succinic anhydride (2.67 g, 26.7 mmol) in DCM/ACN 9:1 (17 mL, 2 M) afforded the desired polymer P4c (21.20 g, 1.61 mmol). $^1$H NMR [400 MHz, δ (ppm), D$_2$O]: 4.10-4.00 (br, 2H, 8-CH$_2$), 3.60-3.20 (br, 10H, 1-CH$_2$+7-CH$_2$), 2.65-2.50 (br, 6H, 6-CH$_2$+9-CH$_2$), 2.50-2.30 (br, 2H, 5-CH$_2$), 2.30-2.10 (br, 2H, 2-CH$_2$), 1.55-1.40 (br, 2H, 3-CH$_2$), 1.00-0.80 (br, 3H, 4-CH$_3$). Experimentally determined copolymer ratio: m/o 90:10. MALDI-TOF: M$_n$ 11.5 kDa. Yield: 70%.

P(PropOx$_{90}$-NHS$_{10}$) P4d

According to the general procedure, the reaction of a solution of P4c (20 g, 1.52 mmol), N-hydroxysuccinimide (1.93 g, 16.76 mmol) and N,N'-diisopropylcarbodiimide (2.83 mL, 18.29 mmol) in DCM/ACN 9:1 (180 mL, 0.2 M) afforded the desired polymer P4d (19.88 g, 1.41 mmol). $^1$H NMR [400 MHz, δ (ppm), DMSO-d$_6$]: 4.10-4.00 (br, 2H, 8-CH$_2$), 3.50-3.30 (br, 10H, 1-CH$_2$+7-CH$_2$), 2.95-2.90 (br, 2H, 9-CH$_2$), 2.75-2.70 (br, 4H, 10-CH$_2$), 2.70-2.65 (br, 2H, 9-CH$_2$), 2.65-2.40 (br, 2H, 6-CH$_2$), 2.35-2.10 (br, 4H, 2-CH$_2$+5-CH$_2$), 1.60-1.40 (br, 2H, 3-CH$_2$), 0.90-0.80 (br, 3H, 4-CH$_3$). Experimentally determined copolymer ratio: m/o 90:10. SEC: M$_n$ 12.2 kDa, Đ 1.21. MALDI-TOF: M$_n$ 12.1 kDa. Yield: 93%.

P(PropOx$_{90}$-Ale$_{10}$) P4e

According to the general procedure, the reaction of a solution of P4d (15 g, 1.06 mmol), sodium alendronate trihydrate (6.92 g, 21.29 mmol), N-hydroxysuccinimide (1.23 g, 10.64 mmol) and N-(3-dimethylaminopropyl)-N'-ethylcarbodiimide hydrochloride (2.04 g, 10.64 mmol) in PBS (87 mL, 0.5 M) afforded the desired polymer P4e (6.57 g, 0.43 mmol). $^1$H NMR [400 MHz, δ (ppm), D$_2$O]: 4.30-4.15 (br, 4H, 8-CH$_2$), 3.80-3.30 (br, 16H, 1-CH$_2$+7-CH$_2$), 3.30-3.20 (br, 2H, 10-CH$_2$), 2.75-2.45 (br, 16H, 5-CH$_2$+6-CH$_2$+9-CH$_2$), 2.45-2.15 (br, 2H, 2-CH$_2$), 2.05-1.75 (br, 4H, 11-CH$_2$+12-CH$_2$), 1.65-1.45 (br, 2H, 3-CH$_2$), 1.15-0.95 (br, 3H, 4-CH$_3$). $^{31}$P NMR [400 MHz, δ (ppm), D$_2$O]: 18.17. Experimentally determined copolymer ratio: m/o/p 90:1:9. MALDI-TOF: M$_n$ 12.2 kDa. Yield: 40%.

Example 5

Synthesis of P(PropOx$_{90}$-Ale$_{20}$)—P5e

P(PropOx$_{70}$-MestOx$_{30}$) P5a

According to the general procedure, the reaction of a solution of methyl tosylate (0.57 mL, 3.76 mmol), n-propyl-2-oxazoline (29.24 mL, 263.53 mmol) and 2-methoxycarbonylethyl-2-oxazoline (15.57 mL, 112.94 mmol) in dry acetonitrile (50 mL, 4 M), terminated by the addition of 2-ethanolamine (2.72 mL, 37.65 mmol) afforded the desired polymer P5a (46.44 g, 3.62 mmol). $^1$H NMR [400 MHz, δ (ppm), CDCl$_3$]: 3.65 (br, 3H, 6-CH$_3$), 3.65-3.30 (br, 8H, 1-CH$_2$), 2.65-2.45 (br, 4H, 5-CH$_2$), 2.40-2.10 (br, 2H, 2-CH$_2$), 1.70-1.50 (br, 2H, 3-CH$_2$), 1.00-0.80 (br, 3H, 4-CH$_3$). Experimentally determined copolymer ratio: m/n 70:30. SEC: M$_n$ 10.1 kDa, Đ 1.12. MALDI-TOF: M$_n$ 10.9 kDa. Yield: 96%.

P(PropOx$_{70}$-OH$_{30}$) P5b

According to the general procedure, the reaction of P5a (46 g, 3.62 mmol) with 2-aminoethanol (22.93 mL, 379.97 mmol) afforded the desired polymer P5b (37.13 g, 2.72 mmol). $^1$H NMR [400 MHz, δ (ppm), D$_2$O]: 3.65 (br, 2H, 8-CH$_2$), 3.75-3.45 (br, 8H, 1-CH$_2$), 3.35-3.20 (br, 2H, 7-CH$_2$), 2.70-2.60 (br, 2H, 6-CH$_2$), 2.60-2.50 (br, 2H, 5-CH$_2$), 2.40-2.15 (br, 2H, 2-CH$_2$), 1.65-1.45 (br, 2H, 3-CH$_2$), 0.9-0.70 (br, 3H, 4-CH$_3$). Experimentally determined copolymer ratio: m/n 70:30. MALDI-TOF: M$_n$ 11.6 kDa. Yield: 75%.

P(PropOx$_{70}$-COOH$_{30}$) P5c

According to the general procedure, the reaction of a solution of P5b (34 g, 2.50 mmol), 4-dimethylamino pyridine (1.83 g, 15.01 mmol) and succinic anhydride (9.01 g, 90.03 mmol) in DCM/ACN 9:1 (54 mL, 2 M) afforded the desired polymer P5c (39.91 g, 2.41 mmol). $^1$H NMR [400 MHz, δ (ppm), D$_2$O]: 4.05-3.85 (br, 2H, 8-CH$_2$), 3.55-3.10 (br, 10H, 1-CH$_2$+7-CH$_2$), 2.65-2.50 (br, 6H, 6-CH$_2$+9-CH$_2$), 2.50-2.30 (br, 2H, 5-CH$_2$), 2.30-2.10 (br, 2H, 2-CH$_2$), 1.55-1.35 (br, 2H, 3-CH$_2$), 0.90-0.75 (br, 3H, 4-CH$_3$). Experimentally determined copolymer ratio: m/o 70:30. MALDI-TOF: M$_n$ 12.1 kDa. Yield: 96%.

P(PropOx$_{70}$-NHS$_{30}$) P5d

According to the general procedure, the reaction of a solution of P5c (28 g, 1.69 mmol), N-hydroxysuccinimide (6.41 g, 55.71 mmol) and N,N'-diisopropylcarbodiimide (9.41 mL, 60.77 mmol) in DCM/ACN 9:1 (581 mL, 0.2 M) afforded the desired polymer P5d (26.28 g, 1.35 mmol). $^1$H NMR [400 MHz, δ (ppm), DMSO-d$_6$]: 4.00-3.90 (br, 2H, 8-CH$_2$), 3.50-3.10 (br, 10H, 1-CH$_2$+7-CH$_2$), 2.90-2.85 (br, 2H, 9-CH$_2$), 2.75-2.70 (br, 4H, 10-CH$_2$), 2.65-2.60 (br, 2H, 9-CH$_2$), 2.60-2.40 (br, 2H, 6-CH$_2$), 2.35-2.10 (br, 4H, 2-CH$_2$+5-CH$_2$), 1.65-1.40 (br, 2H, 3-CH$_2$), 0.85-0.70 (br, 3H, 4-CH$_3$). Experimentally determined copolymer ratio: m/o 90:10. SEC: M$_n$ 15.7 kDa, Đ 1.20. MALDI-TOF: M$_n$ 13.7 kDa. Yield: 80%.

P(PropOx$_{70}$-Ale$_{30}$) P5e

According to the general procedure, the reaction of a solution of P5d (8.0 g, 0.41 mmol), sodium alendronate trihydrate (8.00 g, 24.62 mmol), N-hydroxysuccinimide (1.42 g, 12.31 mmol) and N-(3-dimethylaminopropyl)-N'-ethylcarbodiimide hydrochloride (2.36 g, 12.31 mmol) in PBS (99 mL, 0.5 M) afforded the desired polymer P5e (2.93 g, 0.13 mmol). $^1$H NMR [400 MHz, δ (ppm), D$_2$O]: 4.30-4.15 (br, 4H, 8-CH$_2$), 3.80-3.30 (br, 16H, 1-CH$_2$+7-CH$_2$), 3.20-3.10 (br, 2H, 10-CH$_2$), 2.75-2.45 (br, 16H, 5-CH$_2$+6-CH$_2$+9-CH$_2$), 2.45-2.15 (br, 2H, 2-CH$_2$), 2.05-1.75 (br, 4H, 11-CH$_2$+12-CH$_2$), 1.65-1.45 (br, 2H, 3-CH$_2$), 1.00-0.85 (br, 3H, 4-CH$_3$). $^{31}$P NMR [400 MHz, δ (ppm), D$_2$O]: 18.15. Experimentally determined copolymer ratio: m/o/p 70:3:27. MALDI-TOF: M$_n$ 17.5 kDa. Yield: 31%.

Example 6

Synthesis of P(EtOx$_{70}$-OH$_{20}$-Ale$_{10}$)—P6e
P(EtOx$_{70}$-OH$_{20}$—COOH$_{10}$) P6c According to the general procedure, the reaction of a solution of P3b (15 g, 1.19 mmol), 4-dimethylamino pyridine (0.29 g, 2.38 mmol) and succinic anhydride (1.43 g, 14.27 mmol) in DCM/ACN 9:1 (9 mL, 2 M) afforded the desired polymer P6c (12.28 g, 0.90 mmol). $^1$H NMR [400 MHz, δ (ppm), D$_2$O]: 4.25-4.15 (br, 2H, 9-CH$_2$), 3.80-3.45 (br, 16H, 1-CH$_2$+7-CH$_2$+8-CH$_2$), 3.35-3.25 (br, 2H, 6-CH$_2$), 2.75-2.60 (br, 8H, 5-CH$_2$+10-CH$_2$), 2.60-2.45 (br, 4H, 4-CH$_2$), 2.45-2.25 (br, 2H, 2-CH$_2$), 1.15-1.00 (br, 3H, 3-CH$_3$). Experimentally determined copolymer ratio: m/n/o 70:21:9. MALDI-TOF: M$_n$ 12.2 kDa. Yield: 76%.

P(EtOx$_{70}$-OH$_{20}$—NHS$_{10}$) P6d

According to the general procedure, the reaction of a solution of P6c (12 g, 0.88 mmol), N-hydroxysuccinimide (1.12 g, 9.70 mmol) and N,N'-diisopropylcarbodiimide (1.64 mL, 10.58 mmol) in DCM/ACN 9:1 (104 mL, 0.2 M) afforded the desired polymer P6d (11.48 g, 0.79 mmol). $^1$H NMR [400 MHz, δ (ppm), DMSO-d$_6$]: 4.25-4.15 (br, 2H, 8-CH$_2$), 3.75-3.40 (br, 16H, 1-CH$_2$+6-CH$_2$+7-CH$_2$), 3.35-3.25 (br, 2H, 5-CH$_2$), 3.10-3.00 (br, 2H, 9-CH$_2$), 3.00-2.90 (br, 4H, 10-CH$_2$), 2.90-2.80 (br, 2H, 9-CH$_2$), 2.65-2.45 (br, 8H, 4-CH$_2$), 2.45-2.25 (br, 2H, 2-CH$_2$), 1.10-1.00 (br, 3H, 3-CH$_3$). Experimentally determined copolymer ratio: m/n/o 70:21:9. SEC: M$_n$ 12.7 kDa, Đ 1.25. MALDI-TOF: M$_n$ 12.6 kDa. Yield: 89%.

P(EtOx$_{70}$-OH$_{20}$-Ale$_{10}$) P6e

According to the general procedure, the reaction of a solution of P6d (12 g, 0.83 mmol), sodium alendronate trihydrate (4.88 g, 15.02 mmol), N-hydroxysuccinimide (0.86 g, 7.51 mmol) and N-(3-dimethylaminopropyl)-N'-ethylcarbodiimide hydrochloride (1.44 g, 7.51 mmol) in PBS (62 mL, 0.5 M) afforded the desired polymer P6e (3.41 g, 0.22 mmol). $^1$H NMR [400 MHz, δ (ppm), D$_2$O]: 4.30-4.10 (br, 4H, 8-CH$_2$), 3.80-3.40 (br, 22H, 1-CH$_2$+6-CH$_2$+7-CH$_2$), 3.40-3.30 (br, 2H, 5-CH$_2$), 3.30-3.20 (br, 2H, 10-CH$_2$), 2.75-2.15 (br, 22H, 2-CH$_2$+4-CH$_2$+9-CH$_2$), 2.05-1.75 (br, 4H, 11-CH$_2$+12-CH$_2$), 1.15-0.95 (br, 3H, 3-CH$_3$). $^{31}$P NMR [400 MHz, δ (ppm), D$_2$O]: 18.15. Experimentally determined copolymer ratio: m/n/o/p 70:21:1:8. MALDI-TOF: M$_n$ 12.6 kDa. Yield: 26%.

Example 7

Synthesis of P(EtOx$_{70}$-OH$_{10}$-Ale$_{20}$)—P7e
P(EtOx$_{70}$-OH$_{10}$—COOH$_{20}$) P7c According to the general procedure, the reaction of a solution of P3b (15 g, 1.19 mmol), 4-dimethylamino pyridine (0.58 g, 4.76 mmol) and succinic anhydride (2.86 g, 28.54 mmol) in DCM/ACN 9:1 (17 mL, 2 M) afforded the desired polymer P7c (17.33 g, 1.19 mmol). $^1$H NMR [400 MHz, δ (ppm), D$_2$O]: 4.25-4.15 (br, 2H, 9-CH$_2$), 3.80-3.45 (br, 16H, 1-CH$_2$+7-CH$_2$+8-CH$_2$), 3.35-3.25 (br, 2H, 6-CH$_2$), 2.75-2.60 (br, 8H, 5-CH$_2$+10-CH$_2$), 2.60-2.45 (br, 4H, 4-CH$_2$), 2.40-2.25 (br, 2H, 2-CH$_2$), 1.15-1.00 (br, 3H, 3-CH$_3$). Experimentally determined copolymer ratio: m/n/o 70:12:18. MALDI-TOF: M$_n$ 12.5 kDa.
Yield: 94%.

P(EtOx$_{70}$-OH$_{10}$—NHS$_{20}$) P7d

According to the general procedure, the reaction of a solution of P7c (12 g, 0.82 mmol), N-hydroxysuccinimide (2.08 g, 18.07 mmol) and N,N'-diisopropylcarbodiimide (3.05 mL, 19.72 mmol) in DCM/ACN 9:1 (190 mL, 0.2 M) afforded the desired polymer P7d (11.95 g, 0.72 mmol). $^1$H NMR [400 MHz, δ (ppm), DMSO-d$_6$]: 4.15-4.00 (br, 2H, 8-CH$_2$), 3.75-3.40 (br, 16H, 1-CH$_2$+6-CH$_2$+7-CH$_2$), 3.35-3.25 (br, 2H, 5-CH$_2$), 3.05-2.95 (br, 2H, 9-CH$_2$), 2.95-2.85 (br, 4H, 10-CH$_2$), 2.85-2.70 (br, 2H, 9-CH$_2$), 2.75-2.65 (br, 8H, 4-CH$_2$), 2.40-2.10 (br, 2H, 2-CH$_2$), 1.05-0.95 (br, 3H, 3-CH$_3$). Experimentally determined copolymer ratio: m/n/o 70:12:18. SEC: M$_n$ 14.7 kDa, Đ 1.25. MALDI-TOF: M$_n$ 14.4 kDa. Yield: 88%.

P(EtOx$_{70}$-OH$_{10}$-Ale$_{20}$) P7e

According to the general procedure, the reaction of a solution of P7d (12 g, 0.74 mmol), sodium alendronate trihydrate (8.69 g, 6.74 mmol), N-hydroxysuccinimide (1.54 g, 13.37 mmol) and N-(3-dimethylaminopropyl)-N-ethylcarbodiimide hydrochloride (2.56 g, 13.37 mmol) in PBS (108 mL, 0.5 M) afforded the desired polymer P7e (4.15 g, 0.23 mmol). $^1$H NMR [400 MHz, δ (ppm), D$_2$O]: 4.30-4.10 (br, 4H, 8-CH$_2$), 3.80-3.40 (br, 22H, 1-CH$_2$+6-CH$_2$+7-CH$_2$), 3.40-3.30 (br, 2H, 5-CH$_2$), 3.30-3.20 (br, 2H, 10-CH$_2$), 2.75-2.15 (br, 22H, 2-CH$_2$+4-CH$_2$+9-CH$_2$), 2.05-1.75 (br, 4H, 11-CH$_2$+12-CH$_2$), 1.15-0.95 (br, 3H, 3-CH$_3$). $^{31}$P NMR [400 MHz, δ (ppm), D$_2$O]: 18.25. Experimentally determined copolymer ratio: m/n/o/p 70:12:2:16. MALDI-TOF: M$_n$ 14.6 kDa. Yield: 30%.

Example 8

Synthesis of P(PropOx$_{10}$-OH$_{20}$-Ale$_{10}$)—P8e

P(PropOx$_{70}$-OH$_{20}$—COOH$_{10}$) P8c

According to the general procedure, the reaction of a solution of P5b (13 g, 0.96 mmol), 4-dimethylamino pyridine (0.23 g, 1.91 mmol) and succinic anhydride (1.15 g, 11.47 mmol) in DCM/ACN 9:1 (7 mL, 2 M) afforded the desired polymer P8c (11.62 g, 0.80 mmol). $^1$H NMR [400 MHz, δ (ppm), D$_2$O]: 4.10-3.90 (br, 2H, 10-CH$_2$), 3.70-3.20 (br, 16H, 1-CH$_2$+8-CH$_2$+9-CH$_2$), 3.15-3.00 (br, 2H, 7-CH$_2$), 2.75-2.60 (br, 8H, 6-CH$_2$+11-CH$_2$), 2.65-2.40 (br, 4H, 5-CH$_2$), 2.40-2.10 (br, 2H, 2-CH$_2$), 1.60-1.35 (br, 2H, 3-CH$_2$), 1.00-0.70 (br, 3H, 4-CH$_3$). Experimentally determined copolymer ratio: m/n/o 70:20:10. MALDI-TOF: M$_n$ 11.5 kDa. Yield: 79%.

P(PropOx$_{70}$-OH$_{20}$—NHS$_{10}$) P8d

According to the general procedure, the reaction of a solution of P8c (20 g, 1.37 mmol), N-hydroxysuccinimide (1.74 g, 15.08 mmol) and N,N'-diisopropylcarbodiimide (2.55 mL, 16.45 mmol) in DCM/ACN 9:1 (162 mL, 0.2 M) afforded the desired polymer P8d (17.41 g, 1.12 mmol). $^1$H NMR [400 MHz, δ (ppm), DMSO-d$_6$]: 4.15-4.00 (br, 2H, 9-CH$_2$), 3.55-3.30 (br, 16H, 1-CH$_2$+7-CH$_2$+8-CH$_2$), 3.30-3.20 (br, 2H, 6-CH$_2$), 3.00-2.90 (br, 2H, 10-CH$_2$), 2.85-2.75 (br, 4H, 11-CH$_2$), 2.75-2.65 (br, 2H, 10-CH$_2$), 2.65-2.45 (br, 8H, 5-CH$_2$), 2.35-2.05 (br, 2H, 2-CH$_2$), 1.55-1.30 (br, 2H, 3-CH$_2$), 0.90-0.70 (br, 3H, 4-CH$_3$). Experimentally determined copolymer ratio: m/n/o 70:20:10. SEC: M$_n$ 12.2 kDa, Đ 1.25. MALDI-TOF: M$_n$ 12.1 kDa. Yield: 70%.

P(PropOx$_{70}$-OH$_{20}$-Ale$_{10}$) P8e

According to the general procedure, the reaction of a solution of P8d (7.0 g, 0.45 mmol), sodium alendronate trihydrate (2.93 g, 9.00 mmol), N-hydroxysuccinimide (0.52 g, 4.50 mmol) and N-(3-dimethylaminopropyl)-N'-ethylcarbodiimide hydrochloride (0.86 g, 4.50 mmol) in PBS (37 mL, 0.5 M) afforded the desired polymer P8e (2.71 g, 0.16 mmol). $^1$H NMR [400 MHz, δ (ppm), D$_2$O]: 4.30-4.10 (br, 4H, 9-CH$_2$), 3.80-3.40 (br, 22H, 1-CH$_2$+7-CH$_2$+8-CH$_2$), 3.40-3.30 (br, 2H, 6-CH$_2$), 3.30-3.20 (br, 2H, 11-CH$_2$), 2.75-2.15 (br, 22H, 2-CH$_2$+5-CH$_2$+10-CH$_2$), 2.05-1.75 (br, 4H, 12-CH$_2$+13-CH$_2$), 1.65-1.45 (br, 2H, 3-CH$_2$), 1.15-0.85 (br, 3H, 4-CH$_3$). $^{31}$P NMR [400 MHz, δ (ppm), D$_2$O]: 18.20. Experimentally determined copolymer ratio: m/n/o/p 70:20:1:9. MALDI-TOF: M$_n$ 12.5 kDa. Yield: 36%.

Example 9

Synthesis of P(PropOx$_{70}$-OH$_{10}$-Ale$_{20}$)—P9e

P(PropOx$_{70}$-OH$_{10}$—COOH$_{20}$) P9c

According to the general procedure, the reaction of a solution of P5b (38 g, 2.80 mmol), 4-dimethylamino pyridine (1.37 g, 11.18 mmol) and succinic anhydride (6.71 g, 67.08 mmol) in DCM/ACN 9:1 (41 mL, 2 M) afforded the desired polymer P9c (41.10 g, 2.64 mmol). $^1$H NMR [400 MHz, δ (ppm), D$_2$O]: 4.10-3.90 (br, 2H, 10-CH$_2$), 3.70-3.20 (br, 16H, 1-CH$_2$+8-CH$_2$+9-CH$_2$), 3.15-3.00 (br, 2H, 7-CH$_2$), 2.65-2.60 (br, 8H, 6-CH$_2$+11-CH$_2$), 2.65-2.40 (br, 4H, 5-CH$_2$), 2.40-2.10 (br, 2H, 2-CH$_2$), 1.60-1.35 (br, 2H, 3-CH$_2$), 1.00-0.70 (br, 3H, 4-CH$_3$). Experimentally determined copolymer ratio: m/n/o 70:10:20.

MALDI-TOF: M$_n$ 12.8 kDa. Yield: 94%.

P(PropOx$_{70}$-OH$_{10}$—NHS$_{20}$) P9d

According to the general procedure, the reaction of a solution of P9c (41 g, 2.63 mmol), N-hydroxysuccinimide (6.66 g, 57.86 mmol) and N,N'-diisopropylcarbodiimide (9.77 mL, 63.12 mmol) in DCM/ACN 9:1 (608 mL, 0.2 M) afforded the desired polymer P9d (38.62 g, 2.20 mmol). $^1$H NMR [400 MHz, δ (ppm), DMSO-d$_6$]: 4.05-3.90 (br, 2H, 9-CH$_2$), 3.55-3.30 (br, 16H, 1-CH$_2$+7-CH$_2$+8-CH$_2$), 3.30-3.20 (br, 2H, 6-CH$_2$), 3.05-2.95 (br, 2H, 10-CH$_2$), 2.95-2.85 (br, 4H, 11-CH$_2$), 2.85-2.70 (br, 2H, 10-CH$_2$), 2.70-2.55 (br, 8H, 5-CH$_2$), 2.35-2.05 (br, 2H, 2-CH$_2$), 1.55-1.30 (br, 2H, 3-CH$_2$), 0.90-0.70 (br, 3H, 4-CH$_3$). Experimentally determined copolymer ratio: m/n/o 70:10:20. SEC: M$_n$ 14.9 kDa, Đ 1.21. MALDI-TOF: M$_n$ 14.4 kDa. Yield: 84%.

P(PropOx$_{70}$-OH$_{10}$-Ale$_{20}$) P9e

According to the general procedure, the reaction of a solution of P9d (12.5 g, 0.62 mmol), sodium alendronate trihydrate (12.05 g, 37.07 mmol), N-hydroxysuccinimide (2.13 g, 18.54 mmol) and N-(3-dimethylaminopropyl)-N'-ethylcarbodiimide hydrochloride (3.55 g, 18.54 mmol) in PBS (150 mL, 0.5 M) afforded the desired polymer P9e (4.82 g, 0.22 mmol). $^1$H NMR [400 MHz, δ (ppm), D$_2$O]: 4.25-4.10 (br, 4H, 9-CH$_2$), 3.80-3.40 (br, 22H, 1-CH$_2$+7-CH$_2$+8-CH$_2$), 3.35-3.30 (br, 2H, 6-CH$_2$), 3.25-3.15 (br, 2H, 11-CH$_2$), 2.75-2.20 (br, 22H, 2-CH$_2$+5-CH$_2$+10-CH$_2$), 2.05-1.75 (br, 4H, 12-CH$_2$+13-CH$_2$), 1.65-1.45 (br, 2H, 3-CH$_2$), 1.00-0.85 (br, 3H, 4-CH$_3$). $^{31}$P NMR [400 MHz, δ (ppm), D$_2$O]: 18.12. Experimentally determined copolymer ratio: m/n/o/p 70:10:3:17. MALDI-TOF: M$_n$ 17.9 kDa. Yield: 35%.

Example 10

Synthesis of P(EtOx$_{70}$-COOH$_{20}$-Ale$_{10}$)—P10e

According to the general procedure, the reaction of a solution of P3d (15 g, 0.81 mmol), sodium alendronate trihydrate (10.54 g, 32.41 mmol), N-hydroxysuccinimide (1.86 g, 16.20 mmol) and N-(3-dimethylaminopropyl)-N'-ethylcarbodiimide hydrochloride (1.86 g, 16.20 mmol) in PBS (131 mL, 0.5 M) afforded the desired polymer P10e (5.22 g, 0.28 mmol). $^1$H NMR [400 MHz, δ (ppm), D$_2$O]: 4.30-4.10 (br, 4H, 6-CH$_2$), 3.80-3.40 (br, 16H, 1-CH$_2$+5-CH$_2$), 3.30-3.20 (br, 2H, 8-CH$_2$), 2.75-2.15 (br, 18H, 2-CH$_2$+4-CH$_2$+7-CH$_2$), 2.05-1.75 (br, 4H, 9-CH$_2$+10-CH$_2$), 1.15-0.95 (br, 3H, 3-CH$_3$). $^{31}$P NMR [400 MHz, δ (ppm), D$_2$O]: 18.18. Experimentally determined copolymer ratio: m/o/p 70:17:13. MALDI-TOF: M$_n$ 16.3 kDa. Yield: 34%.

Example 11

Synthesis of P(EtOx$_{70}$-COOH$_{10}$-Ale$_{20}$)—P11e

According to the general procedure, the reaction of a solution of P3d (15 g, 0.81 mmol), sodium alendronate trihydrate (10.54 g, 32.41 mmol), N-hydroxysuccinimide (1.86 g, 16.2 mmol) and N-(3-dimethylaminopropyl)-N'- ethylcarbodiimide hydrochloride (3.11 g, 16.20 mmol) in PBS (131 mL, 0.5 M) afforded the desired polymer P11e (4.99 g, 0.24 mmol). $^1$H NMR [400 MHz, δ (ppm), D$_2$O]: 4.25-4.10 (br, 4H, 6-CH$_2$), 3.80-3.40 (br, 16H, 1-CH$_2$+5-CH$_2$), 3.25-3.15 (br, 2H, 8-CH$_2$), 2.75-2.15 (br, 18H, 2-CH$_2$+4-CH$_2$+7-CH$_2$), 2.05-1.70 (br, 4H, 9-CH$_2$+10-CH$_2$), 1.15-0.95 (br, 3H, 3-CH$_3$). $^{31}$P NMR [400 MHz, δ (ppm), D$_2$O]: 18.25. Experimentally determined copolymer ratio: m/o/p 70:10:20. MALDI-TOF: $M_n$ 16.3 kDa. Yield: 30%.

Example 12

Synthesis of P(PropOx$_{70}$-COOH$_{20}$-Ale$_{10}$)—P12e

According to the general procedure, the reaction of a solution of P5d (5.0 g, 0.26 mmol), sodium alendronate trihydrate (1.67 g, 5.13 mmol), N-hydroxysuccinimide (0.30 g, 2.56 mmol) and N-(3-dimethylaminopropyl)-N'-ethylcarbodiimide hydrochloride (0.49 g, 2.56 mmol) in PBS (21 mL, 0.5 M) afforded the desired polymer P12e (2.17 g, 0.12 mmol). $^1$H NMR [400 MHz, δ (ppm), D$_2$O]: 4.30-4.15 (br, 4H, 7-CH$_2$), 3.80-3.30 (br, 16H, 1-CH$_2$+6-CH$_2$), 3.30-3.20 (br, 2H, 9-CH$_2$), 2.75-2.15 (br, 18H, 2-CH$_2$+5-CH$_2$+8-CH$_2$), 2.05-1.75 (br, 4H, 10-CH$_2$+11-CH$_2$), 1.65-1.45 (br, 2H, 3-CH$_3$), 1.15-0.95 (br, 3H, 4-CH$_3$). $^{31}$P NMR [400 MHz, δ (ppm), D$_2$O]: 18.00. Experimentally determined copolymer ratio: m/o/p 70:22:8. MALDI-TOF: $M_n$ 14.8 kDa. Yield: 46%.

Example 13

Characterization of Alendronate-Functionalized Poly(2-Oxazoline)s

The degree of modification of the different substitutions in the polymers was determined by $^1$H NMR. Moreover, the presence of alendronate moieties by $^{31}$P NMR. NMR spectra was recorded on a Varian Inova 400 (400 MHz) or Bruker Avance III (400 MHz) spectrometer in the indicated solvent at 25° C. $^1$H NMR data is reported as: chemical shifts (given in parts per million (ppm) with respect to tetramethylsilane as standard), multiplicity (br=broad), integration, and assignment. The number average molecular weights ($M_n$) was recorded on a Bruker Microflex LRF Matrix-assisted laser desorption ionisation time-of-flight mass spectrometry (MALDI-TOF MS) system. All mass spectra were obtained in positive ion mode. α-Cyano-4-hydroxycinnamic acid (CHCA) was used as a matrix in tetrahydrofuran (10 mg/mL). Polymer samples were dissolved in THF:methanol v/v 1:1 (10 mg/mL) and analyte solutions were prepared by mixing 10 μL of matrix and 1 μL of polymer sample. Samples were applied using the dried droplet method. Size exclusion chromatography (SEC) was performed on an automated Shimadzu HPLC system, with a PLgel 5 μm MIXED-D column at 50° C., using N,N-dimethylacetamide (DMA) containing 50 mM LiCl as eluent at a flow rate of 0.6 mL/min. Polydispersity index values (PDI) were calculated against poly(methyl methacrylate) (PMMA) standards.

The results of these analyses are summarized in Table 1.

TABLE 1

| | $^1$H NMR (mol %) | | | | | $M_n$ (kDa) | | |
|---|---|---|---|---|---|---|---|---|
| | EtOx/PropOx | OH | COOH | Ale | Conversion (%) | Theor.[a] | MALDI-TOF | PDI |
| P1e | 90 | | 1 | 9 | 90 | 12.8 | 12.0 | 1.11 |
| P2e | 80 | | 1 | 19 | 95 | 15.8 | 15.0 | 1.17 |
| P3e | 70 | | 2 | 28 | 93 | 19.1 | 19.5 | 1.11 |
| P6e | 70 | 21 | 1 | 8 | 89 | 13.1 | 12.6 | 1.11 |
| P7e | 70 | 12 | 2 | 16 | 89 | 15.5 | 14.6 | 1.11 |
| P10e | 70 | | 17 | 13 | 100 | 15.9 | 16.3 | 1.11 |
| P11e | 70 | | 10 | 20 | 100 | 17.4 | 16.3 | 1.11 |
| P4e | 90 | | 1 | 9 | 90 | 13.4 | 12.2 | 1.08 |
| P5e | 70 | | 3 | 27 | 90 | 20.4 | 17.5 | 1.12 |
| P8e | 70 | 20 | 1 | 9 | 90 | 14.7 | 12.8 | 1.12 |
| P9e | 70 | 10 | 3 | 17 | 85 | 17.4 | 17.9 | 1.12 |
| P12e | 70 | | 22 | 8 | 80 | 16.3 | 14.8 | 1.12 |
| P13e | 70 | | 10 | 20 | 100 | 18.9 | 17.0 | 1.12 |

Theoretical values were calculated considering the polymerization degree of MestOx-functionalized polymers obtained by MALDI-TOF and functionality ratios by $^1$H NMR.

Example 14

Isothermal Titration Calorimetry (ITC)

Isothermal titration calorimetry was used to assess the affinity between the synthesized POx-Ale polymers and dissolved calcium cations in water. ITC experiments were carried out on a fully automated Microcal Auto-iTC200. Curve fitting was performed by Origin 6.0 using one set of sites binding model. Generally, 0.36 mM per unit of alendronate present in the polymer were titrated with 4 mM $CaCl_2$ in Milli-Q water at 20° C. All polymers were titrated with the same batch of calcium. Each ITC titration consisted of 19 injections. All measurements were performed in triplicate.

The statistical analyses were performed using GraphPad InStat® software. Rheological results were analysed statistically using a one-way ANOVA test, followed by Tukey's multiple comparison test. The significance threshold was set at $P<0.05$.

The results of the ICT analyses are summarized in Table 2.

TABLE 2

| | Stoichiometry, N | $K_{Ca^{2+}}$ ($M^{-1}$) | $\Delta H$ (cal $mol^{-1}$) | $\Delta S$ (cal $deg^{-1}$ $mol^{-1}$) |
|---|---|---|---|---|
| Alendronate | $0.5 \pm 0.0$ | $7.8 \times 10^3 \pm 1.8 \times 10^3$ | $1.3 \times 10^3 \pm 8.5 \times 10^2$ | $22.4 \pm 2.3$ |
| P1e | $6.3 \pm 0.1$ | $1.2 \times 10^4 \pm 1.8 \times 10^3$ | $2.5 \times 10^3 \pm 1.5 \times 10^2$ | $27.1 \pm 0.3$ |
| P2e | $14.3 \pm 1.4$ | $9.1 \times 10^4 \pm 3.9 \times 10^3$ | $1.2 \times 10^3 \pm 1.3 \times 10^2$ | $26.9 \pm 0.4$ |
| P3e | $25.6 \pm 2.4$ | $2.4 \times 10^5 \pm 4.0 \times 10^3$ | $1.5 \times 10^3 \pm 2.4 \times 10^2$ | $29.6 \pm 0.8$ |
| P6e | $6.1 \pm 0.4$ | $1.8 \times 10^4 \pm 6.7 \times 10^2$ | $1.9 \times 10^3 \pm 1.0 \times 10^2$ | $25.9 \pm 0.3$ |
| P7e | $15.1 \pm 0.2$ | $1.2 \times 10^5 \pm 3.6 \times 10^3$ | $1.1 \times 10^3 \pm 2.7 \times 10^2$ | $27.1 \pm 0.9$ |
| P10e | $12.3 \pm 0.9$ | $6.7 \times 10^4 \pm 2.7 \times 10^3$ | $1.8 \times 10^3 \pm 2.3 \times 10^2$ | $28.0 \pm 0.7$ |
| P11e | $18.7 \pm 1.1$ | $1.6 \times 10^5 \pm 5.7 \times 10^3$ | $1.8 \times 10^3 \pm 8.6 \times 10^1$ | $29.5 \pm 0.3$ |
| P4e | $7.9 \pm 0.4$ | $3.5 \times 10^4 \pm 2.3 \times 10^3$ | $2.2 \times 10^3 \pm 3.2 \times 10^2$ | $28.0 \pm 0.9$ |
| P5e | $24.2 \pm 1.0$ | $1.6 \times 10^5 \pm 1.0 \times 10^4$ | $2.0 \times 10^3 \pm 9.3 \times 10^1$ | $30.6 \pm 0.2$ |
| P8e | $8.2 \pm 0.5$ | $4.2 \times 10^4 \pm 8.7 \times 10^3$ | $2.1 \times 10^3 \pm 1.1 \times 10^2$ | $27.0 \pm 0.4$ |
| P9e | $13.8 \pm 1.6$ | $1.1 \times 10^5 \pm 1.8 \times 10^4$ | $2.2 \times 10^3 \pm 2.9 \times 10^2$ | $29.9 \pm 0.9$ |
| P12e | $9.9 \pm 0.7$ | $2.2 \times 10^4 \pm 1.7 \times 10^3$ | $2.1 \times 10^3 \pm 3.3 \times 10^2$ | $27.8 \pm 1.0$ |

Polymers containing alendronate moieties clearly showed a strong interaction with calcium ions as indicated by the binding constant ($Kca^{2+}$). The binding affinity increased linearly with the percentage of alendronate present in the polymer. Furthermore, the interaction of EtOx polymers with $Ca^{2+}$ was 1.5-fold higher than for PropOx which may be due to the better solubility of EtOx in aqueous solutions.

Notably, P(EtOx-Ale) 70-30% showed an enhanced binding affinity with $CaCl_2$ in comparison to alginate (140-fold) and to PEG-Ale polymers (120-fold) reported in literature:
Fang et al., Multiple Steps and Critical Behaviors of the Binding of Calcium to Alginate. *The Journal of Physical Chemistry B* 2007, 111 (10), 2456-2462.
Chu et al., Calcium phosphate nanoparticles functionalized with alendronate-conjugated polyethylene glycol (PEG) for the treatment of bone metastasis. *Int J Pharm* 2017, 516 (1), 352-363.

Example 15

Preparation of Calcium-Crosslinked POx-Ale Gels

Gels were prepared mixing equal volumes of POx-Ale in phosphate buffer saline (PBS) at different polymer concentration (10, 20, 30 wt. %) with several $CaCl_2$ solutions in miliQ water (1, 10, 20, 40 wt. %), with a total volume of 200 μL. The mixtures were stirred vigorously using vortex for 15 sec in order to get homogenous gels.

Visual Observation of Gelation

Mixing equal volumes of alendronate-functionalized polymers and $Ca^{2+}$ solutions at final polymer concentrations of 10, 20 and 30 wt. %, and $Ca^{2+}$ concentrations between 1 and 40 wt. % yielded either viscous solutions or self-healing hydrogels. Generally, increasing both polymer and calcium concentrations formed stronger gels.

Polymers without alendronate moieties with either hydroxyl or carboxylic acid moieties in the side chains ($P(EtOx_{70}-OH_{30})$ and $P(EtOx_{70}-COOH_{30})$) did not increase in viscosity or form gels.

Macroscopically, two different kind of gels were created: $P(EtOx_{70}-Ale_{30})$ and $P(EtOx_{70}-COOH_{10}-Ale_{20})$ produced white stable transient networks; whereas $P(EtOx_{70}-OH_{10}-Ale_{20})$ formed transparent soft gels. When more than 20 mol % alendronate was present in the polymer, or it was accompanied by carboxylic acid moieties, which potentially could bind to $Ca^{2+}$, the binding affinity was so strong that the gelation process competed with polymer precipitation, such precipitation causing the gel to lose its transparency.

The self-healing properties of a hydrogel (30 wt. % $P(EtOx_{70}-OH_{10}-Ale_{20})$ and 20 wt. % $CaCl_2$) was evaluated visually. Two gels of identical composition were coloured using either blue (Brilliant) or red (Amaranth) dyes. They were cut transversally in half, and then two differently dyed halves colour were brought together without applying external force. After two minutes of contact, no border between them was observed, and their connexin was strong enough to allow for stretching.

Rheological Characterization

Rheological properties of the gels were evaluated using an AR2000 Advanced Rheometer (TA instruments) with a flat steel plate geometry (8 mm diameter) and a fix gap distance of 500 μm at 25° C. Frequency sweeps were performed by varying the angular frequency from 0.1 to 10 Hz at a constant strain of 1%. Storage modulus, loss modulus and tan(delta) were determined by carrying out a time sweeps measurement at 1% strain and 1 Hz. The self-healing ability of the gels was evaluated performing three consecutive failure-recovery tests, measuring the recovery of G' after gel destruction, as follows: First, time sweeps was carried out for 10 min at 1% strain and 1 Hz to determine the viscoelastic region. Then, strain was increased gradually for 3 min from 1 till 1000% to ensure network destruction. After that, strain was brought to its initial value for 10 min and the recovery was calculated using the following Equation 1:

$$G' \text{recovery (\%)} = \left(\frac{G'_r}{G'_i}\right) \times 100$$

where $G'_i$ is the average of G' values during the first time sweeps, and $G'_r$ is the average of G' at the second time sweeps. All measurements were performed in triplicate.

Increasing the number of alendronate moieties in the polymer was found to generate gels with enhanced elasticity, as demonstrated by an increase in the storage modulus (G') and loss modulus (G") values. $P(EtOx_{90}-Ale_{10})$ produced viscous gels, whereas increasing the mol % to 30% produced stable solid-like hydrogels. The storage modulus increased: i) 60-fold by changing the alendronate substitution degree from 10% to 20%, ii) 125-fold by increasing the alendronate content from 20% to 30%.

Incorporation of carboxylic acid moieties in the side chain was found to have a positive effect on the storage modulus (G').

All the gels compositions exhibited frequency dependent rheological behaviour. Generally, the strength of the gels increased with the frequency. Only gels containing 10 mol % alendronate exhibited a liquid-like behaviour at low frequencies (characterized by storage modulus (G') lower than loss modulus (G")) and solid like at higher frequencies.

Elastic recovery of three different hydrogels was tested $(P(EtOx_{70}-Ale_{30}))$ and $P(EtOx_{70}-COOH_{10}-Ale_{20}))$ and $P(EtOx_{70}-OH_{10}-Ale_{20}))$. Strain was increased from 1% to 1000% in 3 min to cause gel failure, as manifested by the sudden decrease in storage and loss modulus values. When strain was brought to its initial value of 1%, a very fast elasticity recovery was observed by mean of the value of storage and loss modulus values. Surprisingly, some hydrogels recovered their elasticity more than 100%, which could be explained due to a higher packing density of the gel after the high shear. Hydrogel made with the polymer containing hydroxyl moieties manifested higher yield strengths, which corresponds to increase malleability, whereas the other gels were more brittle.

In Vitro Stability of the Hydrogels

In order to study both the stability and the reversibility of the formed crosslinks, gels were soaked in EDTA (100 mM, pH 6) and they were monitored for 48 h.

$P(EtOx_{70}-OH_{10}-Ale_{20})$ was completely dissolved in EDTA within 3 h of immersion, which confirmed that the crosslinks between $Ca^{2+}$ and alendronate were responsible for the network formation. However, both $P(EtOx_{70}-Ale_{30})$ and $P(EtOx_{70}-COOH_{10}-Ale_{20})$ remained stable even after 48 h of soaking time in EDTA, indicating that the crosslinks were strong enough not to be disrupted by the binding agent.

Example 16

Preparation of Bone- and Mineral-Adhesive Slurries

Gelatin or cellulose as starting material (50 mg) was mixed with POx-Ale at a weight ratio of 1:1. Some of the formulations were supplemented with 10 wt. % of calcium ions ($CaCl_2$), calcium phosphate particles (CaP), polyvinylpyrrolidone (PVP) or Pluronic® (Lutrol® F-68, ex BASF). Subsequently, 0.15 mL of Milli-Q water was added to form a slurry.

The following gelatin- or cellulose-based starting materials were used:
gelatin powder (Gelita SPON®)
fibrous gelatin carrier (Gelita Tuft-it®)
cellulose powder (Gelita-CEL-CA®)

Adhesion to Bone and Mineral Substrates

Adhesion of the slurries was evaluated in vitro against calcium phosphate coated titanium (Ti) plates (CaP—Ti) and cortical bone. A summary of the results is shown in Table 3. Adhesion was scored as:

TABLE 3

| Starting material | Adhesive | Additive(s) | Adhesion to CaP—Ti | Adhesion to bone |
|---|---|---|---|---|
| Gelita SPON | POx-Ale | | 3 | 2 |
| | POx-Ale | Pluronic | 3 | 2 |
| | POx-Ale | $CaCl_2$ | 2 | 1 |
| | POx-Ale | Pluronic, $CaCl_2$ | 2 | 1 |
| | POx-Ale | CaP | 3 | 2 |
| | POx-Ale | Pluronic, CaP | 3 | 2 |
| | POx-Ale | PVP | 3 | 1 |
| | | | 1 | 1 |
| | | CaP | 0 | 0 |
| Gelita Tuft-it | POx-Ale | | 3 | 2 |
| | POx-Ale | CaP | 3 | 2 |
| | | | 1 | 1 |
| | | CaP | 1 | 1 |
| Gelita-CEL-CA | POx-Ale | | 3 | 3 |
| | POx-Ale | CaP | 3 | 3 |
| | | | 3 | 2 |
| | | CaP | 3 | 1 |

3 - very strong adhesion
2 - strong adhesion
1 - weak adhesion
0 - no adhesion

All POx-alendronate slurries were adhesive to both bone and CaP—Ti disks. Adhesion to bone and CaP—Ti was stronger for slurries containing POx-Ale vs. control slurries without POx-Ale. Adhesion of these slurries to bone and CaP—Ti was not improved by the addition of either $CaCl_2$ and/or Pluronic/PVP.

These results indicate that adhesion to bone of above-mentioned slurries is mediated by POx-conjugated alendronate groups, which can be compromised by the presence of soluble calcium ions which may reduce the amount of alendronate groups available for binding to mineral-bound calcium in bone.

Example 17

Preparation of Bone- and Mineral-Adhesive Patches

Commercially available hemostatic patches (2.5×2.5 cm, 60-65 mg) were impregnated with POx-based polymers by soaking them with a blue dyed aqueous solution of POx-Ale (30 mg POx-Ale per mL at a weight ratio patch/polymer of 1:1 or 15 mg POx-Ale per mL at a weight ratio patch/polymer of 1:0.5). Some of the impregnation solutions were supplemented with 10 wt. % of calcium chloride ($CaCl_2$), Alendronate or Pluronic® (Lutrol® F-68, ex BASF). After impregnation, the patches were freeze dried. As controls non-impregnated patches were used.

Subsequently, a backing layer composed of PLGA 8 wt %, PLC 67% and poly(2-ethyl-2-oxazoline) 25 wt % was adhered to the polymer-impregnated patches using a heating plate (100° C.).

The following commercially available patches were used:
gelatin foam (Gelita Rapid®, Gelita Medical Germany)
fibrous cellulose carrier (SURGICEL® SNoW™, Ethicon, USA)

Adhesion to Bone and Mineral Substrates

The adhesion characteristics of the impregnated patches were evaluated in vitro against calcium phosphate coated Ti plates (CaP—Ti) and cortical bone. A summary of the results is shown in Table 4. Adhesion was scored as:

TABLE 4

| Carrier | Adhesive | Additive(s) | Ratio carrier/adhesive/ additive (w/w) | Adhesion to CaP—Ti | Adhesion to bone |
|---|---|---|---|---|---|
| Gelita Rapid | POx-Ale | Pluronic | 1:1:0.1 | 3 | 3 |
|  | POx-Ale | CaCl$_2$, pluronic | 1:1:0.1 | 2 | 2 |
|  | POx-Ale |  | 1:0.5:0 | 3 | 3 |
|  |  |  | 1:0:0 | 0 | 0 |
|  | POx-OH—COOH | Pluronic | 1:1:0.1 | 1 | 1 |
|  | Alendronate | Pluronic | 1:1:0.1 | 2 | 0 |
|  | POx-OH—COOH + alendronate | Pluronic | 1:0.5, 0.5:0.1 | 2 | 0 |
| SNoW | POx-Ale | Pluronic | 1:1:0.1 | 3 | 1 |
|  | POx-Ale | CaCl$_2$, pluronic | 1:1:0.1 | 1 | 1 |
|  | POx-Ale |  | 1:0.5:0 | 2 | 1 |
|  |  |  | 1:0:0 | 0 | 0 |
|  | POx-OH—COOH | Pluronic | 1:1:0.1 | 1 | 0 |

3 - very strong adhesion
2 - strong adhesion
1 - weak adhesion
0 - no adhesion

All patches tested displayed excellent flexibility and bending properties. All POx-alendronate-containing patches were more adhesive to both bone and CaP coated Ti disks compared to their POx-alendronate-free controls. Prototypes receiving adhesion scores of 2 or 3 remained adhesive to bone even after 24 h immersion in a water bath (RT).

Example 18

Isothermal titration calorimetry (see Example 14) was used to assess the affinity between dissolved calcium cations in water and:

P(EtOx$_{80}$-Ale$_{20}$)
Alendronate monosodium trihydrate
P(EtOx$_{70}$-COOH$_{30}$)
P(EtOx$_{70}$-OH$_{30}$)
P(EtOx)=non-functionalized poly(2-ethyl-2-oxazoline), M$_w$ 50 kDa, ex Labshop, the Netherlands It was found that binding of calcium cations with free alendronate was considerably weaker (up to 30-fold) than with alendronate groups conjugated to the polymers (Kca$^{2+}$= 2.4×10$^5$ M$^{-1}$), whereas the binding constants of POx-COOH, POx-OH and P(EtOx) were below the detection limit.

Example 19

Preparation of Bone- and Mineral-Adhesive Patches

Adhesive patches were prepared by dry deposition of adhesive polymers (P(EtOx$_{70}$-Ale$_{30}$) and P(EtOx$_{70}$-OH$_{10}$-Ale$_{20}$)) into commercially available fibrous gelatin carrier (GELITA TUFT-IT®, Germany) of 5×7 cm$^2$. Alendronate-free control patches were prepared by dry deposition of P(EtOx) into the same fibrous gelatin carrier. First, the polymers were processed into fine powders by ball milling at 30 Hz for 10 min, followed by sieving below 63 μm.

Next, the polymers were dried using a rotary evaporator at 40° C., 20 mbar for 16 h and carriers using a vacuum oven at 40° C., 5 mbar for 16 h. Then, the polymer powders were loaded into carriers, in a weight ratio of polymer/carrier 60%:40%, using a high voltage electrostatic impregnation system (Fibroline SL-Preg, France) at 40 kV, 100 Hz for 20 sec, obtaining an homogenous distribution of the polymer powders through the gelatin carriers.

An occlusive polyester backing layer was adhered to the impregnated carrier by two cycles of heating while compressing at 100° C., 30 N for 3 sec, obtaining a final weight ratio of polymer/carrier/backing 42%:28%:30%. Patches were cut using a scalpel (carbon steel, blade 20) into the required dimensions for each experiment. Further, they were placed individually in aluminum bags and dried at 40° C., 5 mbar for 16 h for storage. Finally, they were sealed off at 2 mbar for 4 sec with a nitrogen flush of 600 mbar.

Preparation of Bone Samples

Porcine ribs were obtained and sectioned using a circular saw machine into rectangular pieces of approximately 2.5× 0.7×1.2 cm$^3$. Each piece of bone was polished (Struers TegraPol 35, USA) using carbon paper (P500) at 150 rpm until a flat surface of cortical bone was exposure. Thereafter, the samples were kept frozen at −20° C. until further use.

Flat bone specimens were immersed in 500 mL of Sakura reagent TDE™ 30 and decalcified using the Sakura TDE™

30 electrode system for 24 h. Thereafter, they were kept frozen at −20° C. until further use.

Preparation of Apatite-Coated Titanium Plates

Commercially pure titanium plates (2.5×0.1×2.5 cm$^3$, grade 2) were first grit-blasted to obtain an average roughness R$^a$ of 1.5 μm. Subsequently, these substrates were ultrasonically cleaned with Milli-Q water, followed by isopropanol during 20 min. Next, the substrates were placed on a rotating holder and etched with argon plasma for 10 min prior to physical vapor deposition of a thin adherent coating of hydroxyapatite using a radiofrequency magnetron sputtering system (Edwards ESM 100), at a power of 400 W and an argon pressure of 5×10$^{-3}$ mbar for 12 h. After deposition, the hydroxyapatite-coated plates were crystallized by a heating treatment in a furnace at 650° C. for 2 h, with a heating and cooling rate of 1.5° C./min, yielding an apatitic calcium phosphate coating of 1 μm.

Tensile Tests

Tensile tests were performed using a tensile bench (LS5, Lloyd Instruments, UK) equipped with a 100 N load cell. All measurements were performed in sextuplicate (n=6). Patches were cut into pieces of 1.5×2.5 cm$^2$ (length×height). Each end of the patches was fixed to the tensile grips, and the patches were subsequently tested in dry state at a crosshead displacement speed of 1 mm/min until breakage. The tensile force was recorded as a function of displacement, and the tensile force vs. patch extension was acquired automatically. The tensile strength was calculated as the maximum load before breakage of the samples divided by their cross-sectional area. The tensile modulus of the patches was calculated as the average slope of initial linear part of the stress-strain curves.

The tensile strength and the modulus of the different patches are depicted in Table 5.

TABLE 5

| Patch | Tensile strength (in MPa) | Tensile modulus (in MPa) |
| --- | --- | --- |
| Carrier (GELITA TUFT-IT ®) | 0.74 ± 0.20 | 13.32 ± 3.36 |
| Carrier + backing | 2.03 ± 0.31 | 41.95 ± 8.89 |
| Carrier + backing impregnated with P(EtOx$_{70}$-Ale$_{30}$) | 2.25 ± 0.21 | 44.29 ± 6.94 |
| Carrier + backing impregnated with P(EtOx$_{70}$-OH$_{10}$-Ale$_{20}$) | 3.86 ± 0.72 | 76.22 ± 14.65 |

The application of hydroxyl-functionalized POx polymer onto the patches composed of fibrous gelatin and polyester backing further reinforced these patches. This phenomenon may be attributable to interactions between hydroxyl groups of the polyoxazoline and amines and carboxylic acid groups present in the carrier, but also with the amines present in the backing layer.

Lap-Shear Adhesion Tests to Mineral, Mineral-Free Substrates, Bone and Demineralized Bone Specimens Lap-shear adhesion tests were performed using a tensile bench (LS5, Lloyd Instruments, UK) equipped with a 100 N load cell. All measurements were performed in sextuplicate (n=6). To measure the adhesion to apatite-coated substrates, patches were cut into pieces of 1.5×2.5 cm$^2$. The patches were cut into pieces of 1.5×1.0 cm$^2$ for the adhesion tests onto bone, since the bone samples were smaller. Uncoated titanium and demineralized bone specimens were used as control model surfaces.

Patches were glued to plastic holders. Next, substrates were moistened with PBS soaked gauze followed by controlled attachment of the patches onto the substrates at a force of 10 N for 5 min. Next, lap-shear adhesion tests were carried out at a crosshead displacement speed of 0.5 mm/min. The shear strength was calculated by dividing the maximum load before breakage by their overlapping contact surface of 3.75 cm$^2$ for Ti plates and 1.5 cm$^2$ for bone specimens. The tensile modulus of the patches was calculated as the average slope of initial linear part of the stress-strain curves.

The results of the lap-shear adhesion measurements are summarized in Table 6.

TABLE 6

| | Shear strength (in kPa) | | | |
| --- | --- | --- | --- | --- |
| Patch | Titanium | CaP coated titanium | Bone | Demineralized bone |
| Carrier + backing | 4.44 ± 6.37 | 3.99 ± 2.87 | 2.92 ± 1.61 | 0.66 ± 0.32 |
| Carrier + backing + P(EtOx$_{70}$-Ale$_{30}$) | 4.64 ± 5.27 | 42.24 ± 11.36 | 25.85 ± 12.56 | 0.61 ± 0.15 |
| Carrier + backing + P(EtOx$_{70}$-OH$_{10}$-Ale$_{20}$) | 2.14 ± 3.32 | 35.88 ± 12.60 | 19.66 ± 12.27 | 1.11 ± 0.70 |
| Bio-Gide ® | 0.94 ± 0.91 | 1.01 ± 1.22 | 1.34 ± 0.67 | 2.47 ± 1.20 |

The polymer with the highest number of alendronate moieties (P(EtOx$_{70}$-Ale$_{30}$)) exhibited an adhesion to CaP coated-Ti plates that was 41 times higher, and an adhesion to bone that was 18 times higher than that of Bio-Gide®, a barrier membrane widely used for dental applications.

Under Water Adhesion Tests to Bone

Patches of 1 cm$^2$ were adhered to bone specimens for 5 minutes. Next, they were immersed in 200 mL of water, stirred at 150 rpm and monitored for 24 hours to evaluate their adhesion and swelling. Experiments were done in triplicate.

A summary of the results is shown in Table 7. Degree of swelling was scored as:

3=high swelling
2=medium swelling
1=low swelling

Degree of adhesion was scored as:

TABLE 7

| Patch | Swelling | Adhesion to bone |
| --- | --- | --- |
| Carrier + backing | 3 | − |
| Carrier + backing + P(EtOx$_{70}$-Ale$_{30}$) | 1 | ++ |
| Carrier + backing + P(EtOx$_{70}$-OH$_{10}$-Ale$_{20}$) | 2 | + |
| Carrier + backing + P(EtOx) | 3 | − |

− = no adhesion by any of the patches
+/− = poor adhesion
+ = good adhesion
++ = excellent adhesion by all 3 patches Only the patches containing POx-alendronate remained adhesive to bone after immersion in water for 24 hours. Moreover, these patches showed less swelling than the other patches.

The invention claimed is:

1. A polyoxazoline (POx) copolymer comprising at least 20 oxazoline units, including at least 4 non-terminal oxazoline units that contain a calcium binding group selected from bisphosphonate, citrate, ethylenediaminetetraacetic acid (EDTA) and combinations thereof,
wherein the copolymer comprises:
(a) repeating units A of formula —[N(R$^a$)CH$_2$CH$_2$]—;
(b) repeating units B of formula —[N(R$^b$)CH$_2$CH$_2$]—;
(c) optionally repeating units C of formula —[N(R$^c$)CH$_2$CH$_2$]—;
(d) optionally repeating units D of formula —[N(R$^d$)CH$_2$CH$_2$]—; and
(e) optionally repeating units E of formula —[N(R$^e$)CH$_2$CH$_2$]—;
wherein:
R$^a$ is CO—(CHR$^1$)$_t$—H;
R$^b$ is CO—(CHR$^1$)$_t$—CONH—R$^2$—X—CO—(CHR$^3$)$_u$—CONR$^4$—CO-ccr;
R$^1$ represents H or optionally substituted C$_{1-5}$ alkyl;
R$^2$ represents an optionally substituted C$_{1-5}$ alkylene;
R$^3$ represents H or optionally substituted C$_{1-5}$ alkyl;
R$^4$ represents H or CH$_3$;
X represents O, NR$^{11}$, S or $^+$NR$^{11}$(R$^{12}$);
R$^{11}$ and R$^{12}$ represent H, methyl or ethyl;
t represents 1, 2 or 3;
u represents 1, 2 or 3; and
ccr represents a calcium binding group.

2. The copolymer according to claim 1, wherein the oxazoline units containing a calcium binding group represent 3-50% of the monomeric units contained in the POx copolymer.

3. The copolymer according to claim 1, wherein the copolymer comprises:
repeating units C of formula —[N(R$^c$)CH$_2$CH$_2$]—;
wherein:
R$^c$ is CO—(CHR$^1$)$_t$—CONH—R$^2$—X—CO—R$^5$-cbx;
R$^5$ represents an optionally substituted C$_{1-5}$ alkylene; and
cbx represents a carboxylate containing group.

4. The copolymer according to claim 3, wherein cbx represents COOH or COO$^-$M$^+$, wherein M represents a monovalent metal cation or NH$_4^+$.

5. The copolymer according to claim 1, wherein the copolymer comprises:
repeating units D of formula —[N(R$^d$)CH$_2$CH$_2$]—;
wherein:
R$^d$ is CO—(CHR$^1$)$_t$—CONH—R$^2$—X—R$^6$; and
R$^6$ represents H, methyl or ethyl.

6. The copolymer according to claim 1, wherein the copolymer comprises:
repeating units E of formula —[N(R$^e$)CH$_2$CH$_2$]—;
wherein:
R$^e$ is CO—(CHR$^1$)$_t$—CONH—R$^2$—X—CO—R$^5$—CO-nhs; and
nhs represents a N-hydroxysuccinimidyl group.

7. The copolymer according to claim 1, wherein the copolymer comprises:
repeating units E of formula —[NHCH$_2$CH$_2$]—.

8. The copolymer according to claim 1, wherein the calcium binding group is bisphosphonate.

9. The copolymer according to claim 1, wherein R$^1$ represents H.

10. The copolymer according to claim 1, wherein X represents O.

11. The copolymer according to claim 1, wherein the total number of repeating units A, B, C, D and E in the copolymer is in the range of 60 to 200.

12. A biocompatible medical product comprising a copolymer according to claim 1.

13. A process of preparing a copolymer according to claim 1, said process comprising:
(a) cationic ring opening polymerizing a mixture comprising the following 2-oxazoline monomers A and B:

(A)

(B)

wherein R$^1$ and t are defined as in claim 1, and wherein R$^{11}$ represents an optionally substituted C$_{1-5}$ alkyl;
(b) subjecting at least some of the alkylcarboxy groups of the intermediate polyoxazoline copolymer to amidation by reacting the groups with an amine represented by the following formula: H$_2$N—R$^2$—X—H, wherein R$^2$ and X are as defined in claim 1;
(c) optionally functionalizing at least some of the amidated groups by reacting the groups with succinic anhydride;
(d) optionally activating at least some of the functionalized groups by reacting the groups with N-hydroxysuccinimide to introduce repeating units E of formula —[N(R$^e$)CH$_2$CH$_2$]—; wherein R$^e$ is CO—(CHR$^1$)$_t$—CONH—R$^2$—X—CO—R$^5$—CO-nhs; and nhs represents a N-hydroxysuccinimidyl group;
(e) introducing calcium scavenging functionality by reacting at least some of the activated groups with a reactant comprising a calcium binding group selected from bisphosphonate, citrate, ethylenediaminetetraacetic acid (EDTA) and combinations thereof.

* * * * *